United States Patent [19]
May et al.

[11] Patent Number: 5,544,354
[45] Date of Patent: Aug. 6, 1996

[54] MULTIMEDIA MATRIX ARCHITECTURE USER INTERFACE

[75] Inventors: Robert May, San Francisco; James E. Granger, Corte Madera; Nicolas Peck, Millvalley; Rohn J. Miller, San Francisco, all of Calif.

[73] Assignee: Ikonic Interactive, Inc., San Francisco, Calif.

[21] Appl. No.: 276,864

[22] Filed: Jul. 18, 1994

[51] Int. Cl.$^6$ .................................................. G06F 17/30
[52] U.S. Cl. .......................... 395/600; 395/154; 395/159
[58] Field of Search .................................. 395/600, 154, 395/159

[56] References Cited

U.S. PATENT DOCUMENTS 5,241,671  8/1993  Reed et al. ............................... 395/600
5,251,294  10/1993  Abelow .................................... 395/155

FOREIGN PATENT DOCUMENTS 0348884  6/1989  European Pat. Off. ...... G06F 15/401

OTHER PUBLICATIONS

Graphic Workshop, Version 1.1j, Alchemy Mindworks, (Beeton, Ontario 1991), screen printouts, FIGS. 1–4.
Tonamura et al., "Content Oriented Visual Interface Using Video Icons for Visual Database Systems", 1989 IEEE Workshop on Visual Languages, 4–6 Oct. 1989, Rome, Italy, pp. 68–73.
H. Rangan et al., "A Window–Based Editor for Digital Video and Audio", Proceedings of the Twenty–Fifth Hawaii International Conference on System Sciences, 7–10 Jan. 1992, Kauai, i, pp. 640–648.
Keim et al., "Visual Query Specification in a Multimedia Database System", Proceedings, Visualization '92, 19–23 Oct. Boston, Mass., pp. 194–201.
Satou et al., "A New Type Hypermedia Platform for Industrial Applications", Proceedings of the IECON '93, International Conference on Industrial Electronics, Control, and Instrumentation, 15–19 Nov. 1993, Maui, Hi, pp. 2262–2265.
Mike Langberg, CD–ROM Attracts Heavy Hitters, San Jose Mercury News, p. 1, Mar. 2, 1994.

Primary Examiner—Thomas G. Black
Assistant Examiner—Paul R. Lintz
Attorney, Agent, or Firm—Fenwick & West LLP

[57] ABSTRACT

A user interface provides for accessing a large database of information using both browsing and searching behaviors. The database is hierarchically arranged using matrices containing cells, individual cells in the matrices associated with matrices in lower levels of the database. A viewer may browse the database by using commands that designate cells of interest, and viewing previews of such cells, and topically related cells, and selecting cells for retrieval. The viewer can navigate through the matrices of the database, each time further narrowing the range of cells viewing previews and selecting for retrieval. The user interface further provides for a user-configured matrix in which the user can place a variety of cells from anywhere in the database, allowing rapid access to and retrieval of frequently accessed cells.

43 Claims, 19 Drawing Sheets

MULTIMEDIA MATRIX ARCHITECTURE USER INTERFACE

BACKGROUND OF THE INVENTION

1. Field of the Invention

The present invention relates generally to the field of viewer interfaces, and more particularly to viewer interfaces for accessing multimedia databases.

2. Description of the Background Art

Continuing advances in computer based information storage, retrieval, and telecommunication technologies promise to make large-scale multimedia databases available to a broad spectrum of consumers. Until recently, commercially available databases were limited to providing access to textual information. Now information providers can store and retrieve for online users graphic images, and current developments will enable the storage and retrieval of video and audio data in real time from large collections of such works. Additionally, improvements in telecommunications will enable such databases to be accessed by an ever increasing number and variety of users through computers or televisions connected to the databases of information providers. Database vendors will need to provide viewer interfaces for such multimedia databases that enable consumers to rapidly and efficiently access specific products or services, such as motion pictures, news articles, audio recording, entertainment items, or the like, that are stored in the database. The design of such viewer interfaces requires addressing a number of issues relating to viewer behavior, database size, and system constraints.

User behavior in accessing large databases can be described as falling into one of two categories: "searching" or "browsing." A viewer's behavior typically changes depending on the viewer's mood and perception of the information space—the amount and organization of information in the database—the system's response characteristics, and many other variables. All users demonstrate both kinds of behavior at various times.

Searching involves attempting to locate a specific item, such as the movie "Rear Window," or a specific product, for example, a red plaid medium sized shirt from L. L. Bean, typically by specifically identifying the item of interest. Browsing, by contrast, involves the exploration of various categories of information, such as movies in the "Drama" category or types of casual clothing. Conventional viewer interfaces tend to support a preferred mode of accessing records, either through searching or browsing, which limits the flexibility and adaptability to various users and viewer behaviors. A flexible user interface for a multimedia database should enable efficient searching and browsing, or any combination of behaviors at any time, rather than forcing the viewer to use on approach over the other.

The first class of problems in designing viewer interfaces for efficient browsing results from the sheer size of current and future multimedia databases. Databases providing movies, audio recordings, and new items are likely to have tens of thousands to hundreds of thousands of records in various categories. A user interface should therefore provide for an efficient way to sift through these records in order to locate a specific record in a timely manner.

One method commonly used in viewer interfaces for browsing are hierarchical menus, which are typically text based, but also can be iconographic. Hierarchical systems in general are an efficient way of organizing many records, because they partition the information space of the database into discrete and meaningful segments. Typically, the database is hierarchically arranged into various topical areas, with numerous subtopics, and related records.

However, typical hierarchical menus require the viewer to repeatedly input or select sequential text strings or icons to go "deeper" into the various levels of the database in search of the desired record. Conventionally, only one level of the hierarchy is available to the viewer at any given time, from which the viewer selects one of a number of presented items in order to access the next level of the database. Since the viewer can select only from the choices that are available in the current level of the database, and since only one level is available at a time, conventional browsing can be taxing for the novice viewer who must make guesses about where in the hierarchy a desired record or type of record resides. The viewer has no way of knowing what records reside in the lowest levels of the database without actually selecting a menu and traversing to the lower level menus. This is true even with iconographic menus, which generally show only icons for one level of the database at any given time.

Assume, for example, a database offering various entertainment services, including movies from various providers, and in numerous categories. A typical viewer may be interested in browsing for a movie to watch, but does not have a particular movie genre in mind. In a conventional interface, if the viewer is at a menu of movie genres, such as "Westerns," "Horror," "Drama", "Science Fiction," and the like, the viewer typically has no information about what specific movies are included in each category. Thus the viewer has to select "Drama" to get a list of movie titles. Typically, little or any information about individual movies is provided. If the list does not contain anything of interest, the viewer has to move back up to the genre menu, and proceed to the next category. This repeated selection process can be very time consuming for extremely large databases, thereby inhibiting exploration, and thus use of the database, and leading to viewer dissatisfaction.

The above example illustrates some of the problems with conventional hierarchical menu interfaces. The viewer must learn the structure of the database either by reviewing printed codes or repeated usage. In the latter case, the viewer's knowledge is limited to an understanding of only the various branches of the hierarchy the viewer has previously explored. Further, the active involvement required to make the repeated selections or inputs can be fundamentally foreign to certain groups of users. Television viewers typically prefer a passive relationship to their content source (e.g. TV programs), where only very limited active searching by the viewer is necessary. Such users typically will not invest the effort necessary to explore and use a conventional database using hierarchical menus.

Another significant problem is the "depth," or number of levels, with which it is necessary to organize very large databases, even where the records are organized by one or more criteria. The depth of the database compounds the repeated selection problem, further impeding browsing by the viewer. A related problem is heterogeny of data. In today's large multimedia databases, media types may vary from text and static graphics, to full color photographs, computer animations, full motion video, and stereo quality audio, with all possible permutations. Conventional text based hierarchical menus cannot adequately represent or describe the various types of media found in large multimedia databases, limiting the viewer's understanding of the available content, and impeding exploration of the database.

User interfaces designed for searching also encounter various problems when applied to multimedia databases.

Again, the large number of records in such databases can make it difficult to precisely and quickly locate a particular record. Searching generally requires alphanumeric input capabilities in order to allow the viewer to precisely identify the item of interest. Alphanumeric input requires specific input devices, either keyboards, mice, or the like, which limits the accessibility of the database to users with the required components, and thus prevents use by those potential users who do not already possess the required hardware. While keyboard based interfaces allow rapid text entry, they limit the application of the interface to computer based systems. Iconographic interfaces that provide simulated keyboards, with either alphabetical letter strings, or pictographic typewriters are very slow and error prone, severely hampering text entry. In addition, efficient searching requires the ability to concatenate searches, for example, performing a first search for all movies, and then all Hitchcock films, and finally selecting the movie "Rear Window" from a list of Hitchcock films. Thus systems that require a specific designation of a record do not satisfy the needs of viewer to incrementally narrow a search set to locate a specific item.

An additional concern of both searching and browsing interfaces, is that regardless of the depth or breadth of the database, it should be possible for the viewer to place records at viewer-determined positions so that the viewer can organize information within the database to facilitate immediate access to frequently used data. Conventional interfaces offer little customization by the viewer, at best, allowing the viewer to save previous search results, or simple preferences. Further, to the extent that conventional interfaces allow customization, they do so using a distinct set of commands and operations that are typically unrelated to the actual commands for accessing the database. That is, the user must learn one set of operations for retrieving records from the database, and a separate set of commands for customizing the interface. This increases the apparent complexity of the interface to the user, requiring the user to invest a greater effort to learn the various commands, and thereby discouraging the passive, casual user from customizing the interface.

In conventional databases that provide records of different types, the sets of data associated with various categories, or data types may have differing levels of granularity. Thus where it is meaningful to organize the records of one data type into five hierarchical levels, for example, it may be meaningful to organize another data set into only two levels. Conventional databases provide no standard mechanism that is independent of the actual data, for accommodating these differing levels of granularity in a manner transparent to the viewer. Rather, where there is a high level of granularity, the viewer typically must make numerous selections to narrow the data set to identify a desired record.

There are various other concerns that must be addressed during the design of a user interface. Given the breadth of potential users with different hardware, such as computers or televisions, there is a very limited ability to rely on the use of specific input devices for operating the user interface. Conventional viewer interfaces for databases generally require a computer, and either a keyboard for text input, a mouse for iconographic input, or both. These components are still found in only a small number of homes, and even there, are fixed to specific computers and operating systems that may not be interoperable with the service provider's database and computer system. Also, while computer and telecommunication systems are becoming increasing powerful, there are still serious computational and transmission limits that constrain the type of information the user interface can convey to the viewer at any given time; this is especially true for databases which will be accessed by thousands of users simultaneously. Limited bandwidth and transmission speeds limit many viewer interfaces to simple text driven interfaces, that suffer from the above described problems.

Finally, conventional viewer interfaces are generally designed to offer the products or services of a single service provider, and thus offer little flexibility to accommodate multiple, potentially competitive providers. Conventional interfaces do not offer a usage model that can be used to develop fee structures based on the usage patterns of users. While users may use a given interface in a particular manner, accessing certain records or categories more frequently than others, conventional databases do not lend themselves to a model of use that can determine relative pricing for "placing" records at various points in the database.

In addition, because conventional databases are designed primarily around one service provider's data, the interfaces are typically specifically adapted to search through the provider's database and its internal data structures. Accordingly, because of the integration of the data with the interface, there is little flexibility in the interface for accessing database of multiple database vendors having a variety of different underlying databases.

Accordingly, it is desirable to provide a user interface which overcomes the limitations of existing viewer interfaces. A desirable user interface will enable the viewer to see various levels of the hierarchy at once, so that the viewer can determine if a given category of information is desirable based on actual records in the category, and not merely on a textual or graphic label for the category. Further the user interface should allow direct access to specific records from any number of levels "above" the level to which the record is formally linked. This overcomes the repeated selection problem and the disparities of granularity among data sets, and provides for instantly "flattening" the hierarchical structure of the database. The user interface also should enable viewers to navigate readily throughout the database, providing the above described information, while informing viewers of "where" they are in the database, and how they can return to where they started or from where they most recently came.

A desirable user interface will enable a viewer to determine the contents of any record in a standard fashion, using standard techniques for the heterogeneous data types. In addition, the viewer will be able to rapidly view and compare a plurality of like records when deciding on which record to access. A successful user interface will thus bring the disparate records, or programs, to the viewer, without requiring the viewer to actively search while in a passive viewing state.

It is also desirable for a user interface to make only limited assumptions about the capabilities of input devices available. The user interface should thus be manipulable without requiring hardware that is unlikely to be readily available to the majority of users. Similarly, the user interface should accommodate the resource limitations and communications or processor demands from the rapid searching and display of multimedia data types by multiple users.

Further, it is desirable to provide an interface that can access a number of different databases provided by differing vendors, while offering a common interface and set of operations to the user. This separates the user interface from the underlying design of the databases, and affords the user access to a larger universe of information without the increased need to learn to use multiple interfaces.

Additionally, it is desirable for the user interface to offer a standard arrangement of records to enable business opportunities and advertising sales by the service provider to various database vendors based on the value of given locations within the user interface according to a model of viewer usage. In conjunction with such business opportunities, the interface should allow multiple points of access to the records of a given vendor, thereby allowing those vendors who purchase more locations in the interface to achieve greater visibility to the user. In addition, multiple points of access provide increased efficiencies by reducing redundant data storage.

Finally, a successful user interface will enable its viewers to easily identify and configure their own data sets for easy access to frequently used records. The user interface should allow configuration in a manner that is entirely consistent with the methods of use provided by the interface, thereby reducing the burden on the viewer in learning a variety of distinct operations, and encouraging customization by casual or more passive users.

SUMMARY OF THE INVENTION

A user interface provides access to a large database of records. The interface is comprised of a hierarchical plurality of matrices, each matrix including cells. One matrix is displayed to the viewer, showing the cells of the matrix. The interface includes a content window for displaying either previews or the content of records. The viewer can focus on a cell in the matrix, thereby displaying a preview of the focused cell in the content window. Upon seeing a preview of interest, the viewer can select the focused cell, causing either the contents of the focused cell to be retrieved in full, or the matrix of cells currently displayed to be updated to show a new matrix associated with the focused cell. Once the new matrix is displayed, a new series of previews is displayed, and again the user may focus and select various cells in the displayed matrix. Navigation commands enable the viewer to navigate between the levels of the database, and to increase or reverse the display of previews, and to skip forwards or backwards between previews. Also, the interface provides for searching for selected cells using search cells that filter the titles of cells that are available at or below the level of the database that viewer is currently viewing. The user can then select a desired item for retrieval.

The user interface supports various methods of accessing a database, including the steps of focusing a cell, displaying a preview of a focused cell, and selectively retrieving data of a focused cell. Further refinements of the method include continuously determining if there is a user input during the display of a preview, and if not, then displaying a preview of a next cell. The viewer may select a focused parser cell, and thereby update the displayed matrix to show the cells in the matrix associated with the focused parser cell.

DESCRIPTION OF THE PREFERRED EMBODIMENT

Structure of the Matrix Architecture User Interface

The Matrix Concept and the Hierarchical Data Structure

The matrix architecture user interface of the present invention is modeled on the concept of a hierarchical database. The database is organized using a series of matrices, each matrix including a number of cells, and each cell in a matrix associated with either a record in the database or a further matrix of cells. The matrix architecture user interface provides methods for rapidly and easily browsing through various topical areas, or searching for individual records in such a hierarchical database, overcoming the limitations of existing viewer interfaces to large databases.

Figure 1A:
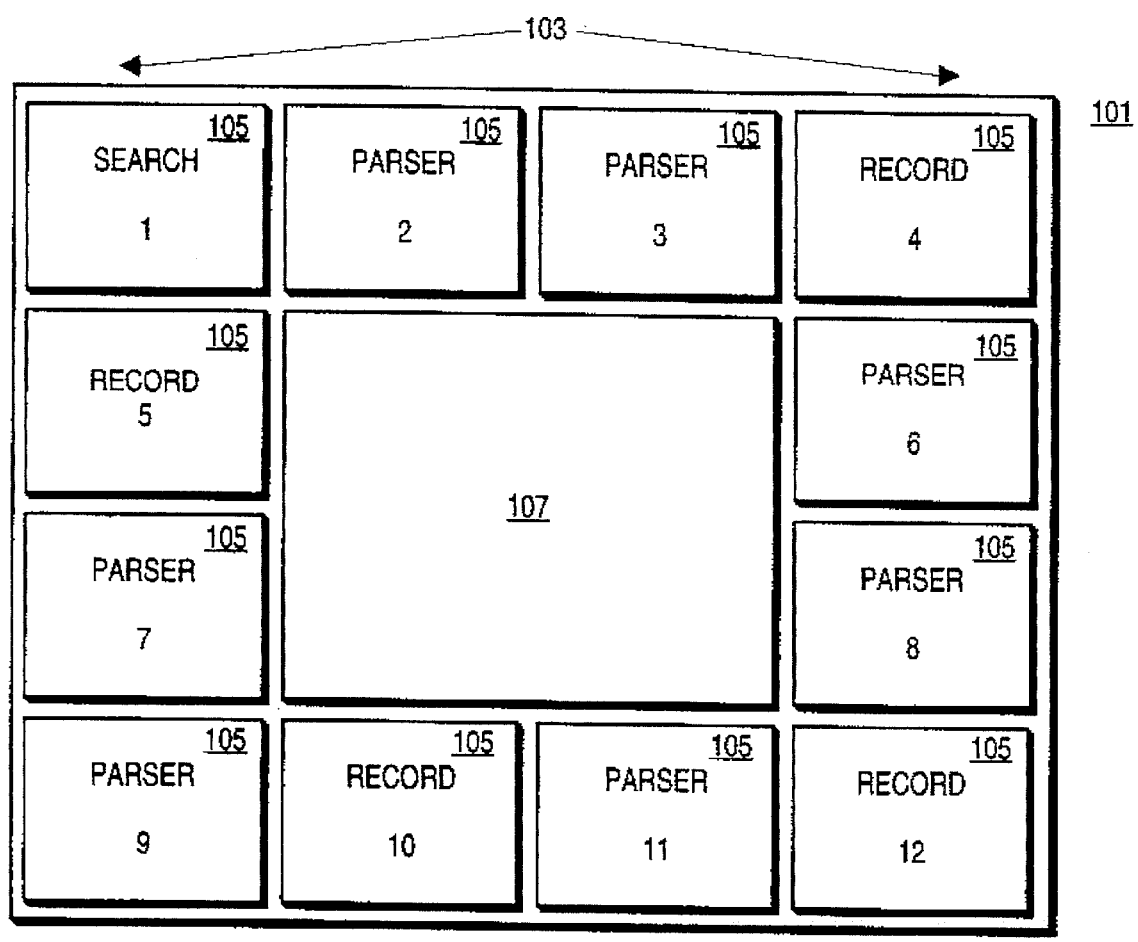
FIGS. 1A–1H are various illustrations of the matrix architecture user interface of the present invention.

Referring now to FIG. 1A, there is shown an embodiment of the matrix architecture user interface of the present invention for accessing large multimedia databases. The matrix architecture user interface 101 includes a displayed matrix 103 of cells 105, and a content window 107. Though there are numerous matrices in the database, only one matrix 103 is displayed at a time to the viewer. The displayed matrix 103 changes according to the viewer's inputs as the viewer accesses different parts of the underlying database.

The matrix arrangement of the cells 105 defines a serial ordering for the cells 105, the ordering defining a sequence by which a viewer can access each of the cells 105 displayed in the interface using a pointing device (not shown). In the preferred embodiment the ordering is from left to right, top to bottom, the top left cell being the first cell, and the bottom right cell being the last cell. FIG. 1A shows numbering indicative of the ordering of the cells 105 in the preferred embodiment, with the various cells 105 labeled 1 through 12. The ordering is circular in that the first cell 105 in the upper left hand corner is assumed to also be next to the last cell 105 in the lower right, such that navigating from the last cell places the viewer at the first cell. Other orderings of the cells are possible, and the matrix architecture user interface 101 provides for customization of the ordering according to the needs of the service provider. The service provider can define the order based on the frequency of use for the various cell positions, and can accordingly model a fee structure for selling advertising or content in each cell based on the cell position in the matrix 103. One benefit of the matrix architecture user interface 101 is that regardless of how the serial ordering is defined, there will always be readily identifiable patterns of access that the service provider can use in determining a pricing structure.

The displayed matrix 103 shows one portion of a hierarchical data structure based on the service provider's database of records. This hierarchical structure is composed of four different types of cells 105, specifically record cells, parser cells, search cells, and code cells. The hierarchical data structure underlying the matrix architecture user interface 101 is provided by the parser cells. Each parser cell is associated with a specific subset of cells in a next lower level of the database, also called a matrix 104, which may include parser cells, record cells, search cells, or code cells, or any combination thereof. Only one matrix 104 is displayed at a time to the viewer, through the use of various navigation and operational commands further described below. The database is hierarchical because a parser cell may be associated with a matrix 104 including other parser cells in the next lower level of the database. (In the remainder of this disclosure, the term "the matrix 103" refers to the matrix displayed to the viewer at any given time, and the terms "matrix 104" or "matrices 104" refer to any matrix or number of matrices in lower levels of the database not currently displayed to the viewer. Since all of the matrices shown in FIGS. 1A–G are shown as displayed, they are referenced individually as "the matrix 103", but it should be clear from the foregoing that each is a separate and distinct matrix 104 when it is not displayed to the viewer.)

It is important to realize the distinction between the cells and the matrices as constituting a hierarchical database, and thereby a logical structure, and the visual representation of the cells and matrices when displayed to the viewer. Accordingly, in the preferred embodiment each of the cells 105, the content window 107, and the overall matrix 103 as displayed are rectangular in shape, and of 3:4 proportion, as is typically found in televisions sets conforming to the NTSC standard. However, the shape and size of the cells and content window 107 and the visual arrangement of the matrix 103 can vary. For example, in various embodiments, the cells 105, matrix 103, or content window 107 can be square, or even circular, or any other shape found suitable by the service provider. Further, the matrix 103 need not surround the content window 107, but may take any arrangement suitable to the service provider's needs. Regardless of the visual appearance of these elements, the underlying hierarchical arrangement of the database is the same, as is the functional operation of the matrix architecture user interface 101.

Figure 1B:
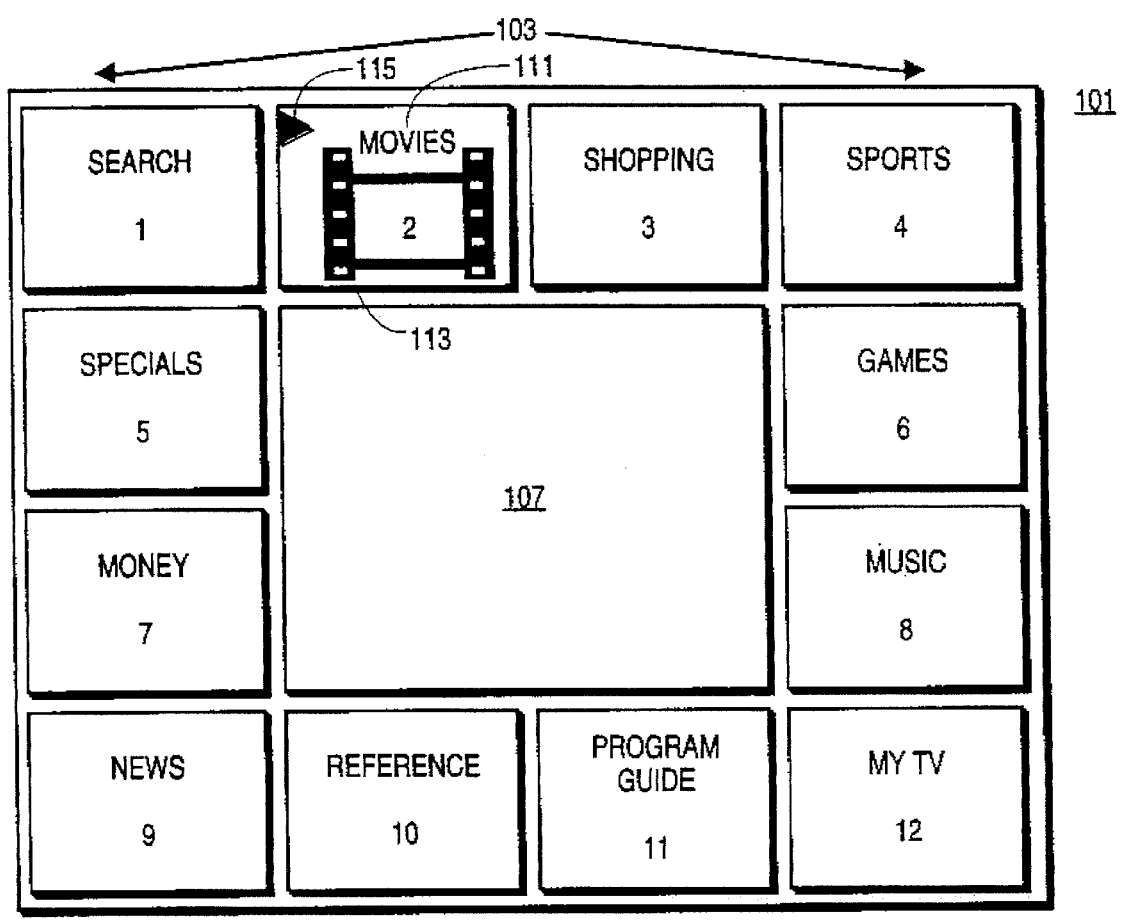
Figure 1C:
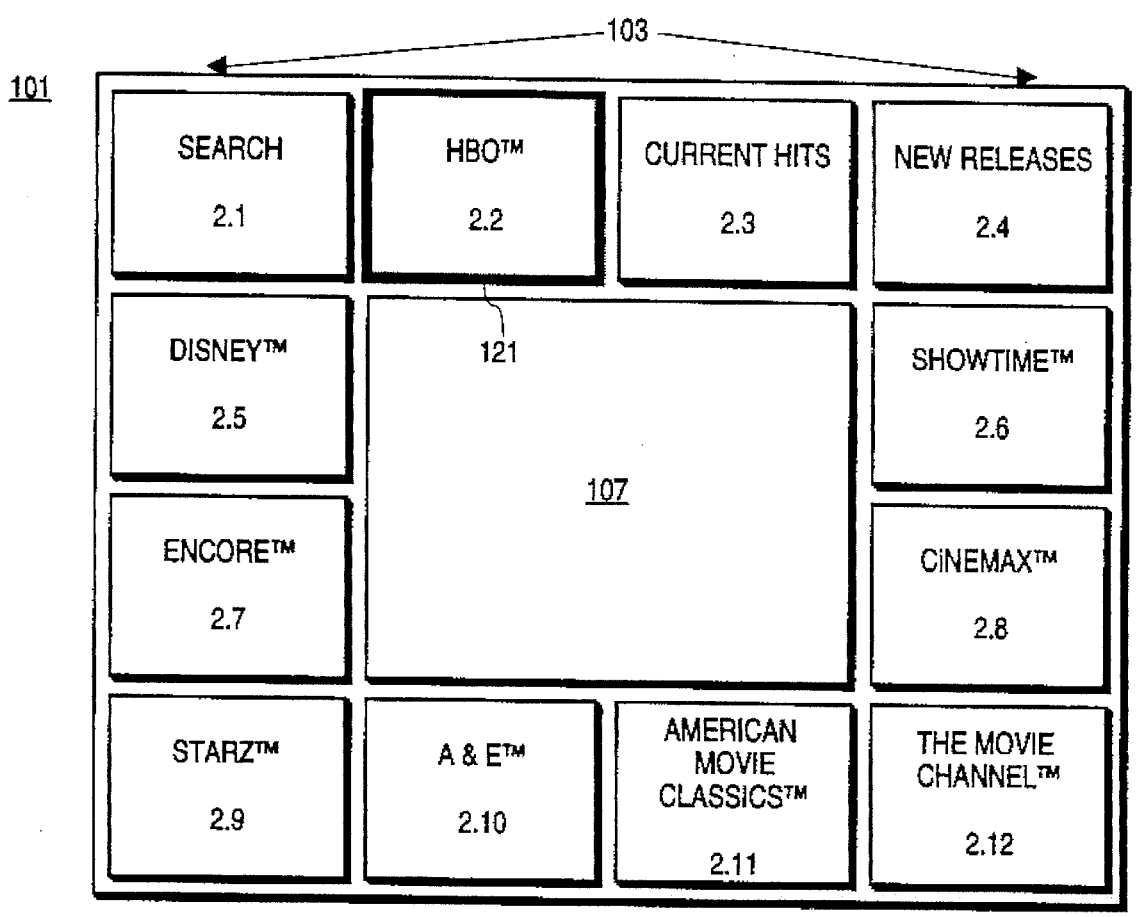

The hierarchical structure can be understood from the following example, In FIG. 1B each of the cells 105, other than the cell labeled "Search," is a parser cell. The parser cell labeled "Movies" in serial position two is associated with the matrix 103 of cells shown in FIG. 1C, which includes other parser cells associated with cells 105 having a movie data type. Each of the parser cells in FIG. 1C is likewise associated with a matrix 104 of cells, again including either record cells, parser cells, search cells, or code cells. Thus the parser cell in FIG. 1C in the second serial position, label "HBO™," is associated with the matrix 103 of parser cells shown in FIG. 1D, which categorizes the movies provided by the HBO™ service into different genres. This hierarchical data structure allows a viewer to quickly access and display a specific set of cells in the database within a given topical content area using the functions provided by the matrix architecture user interface 101. In the preferred embodiment, each matrix 104 includes twelve cells 105, including any combination of parser cells, record cells, or code cells. In other embodiments some other number of cells may included in a matrix 104. Using a fixed number of cells 105 in each matrix provides the viewer with a consistent interface, and reduces the apparent complexity of the information space, thereby encouraging exploration of the database and retrieval of information.

Figure 1D:
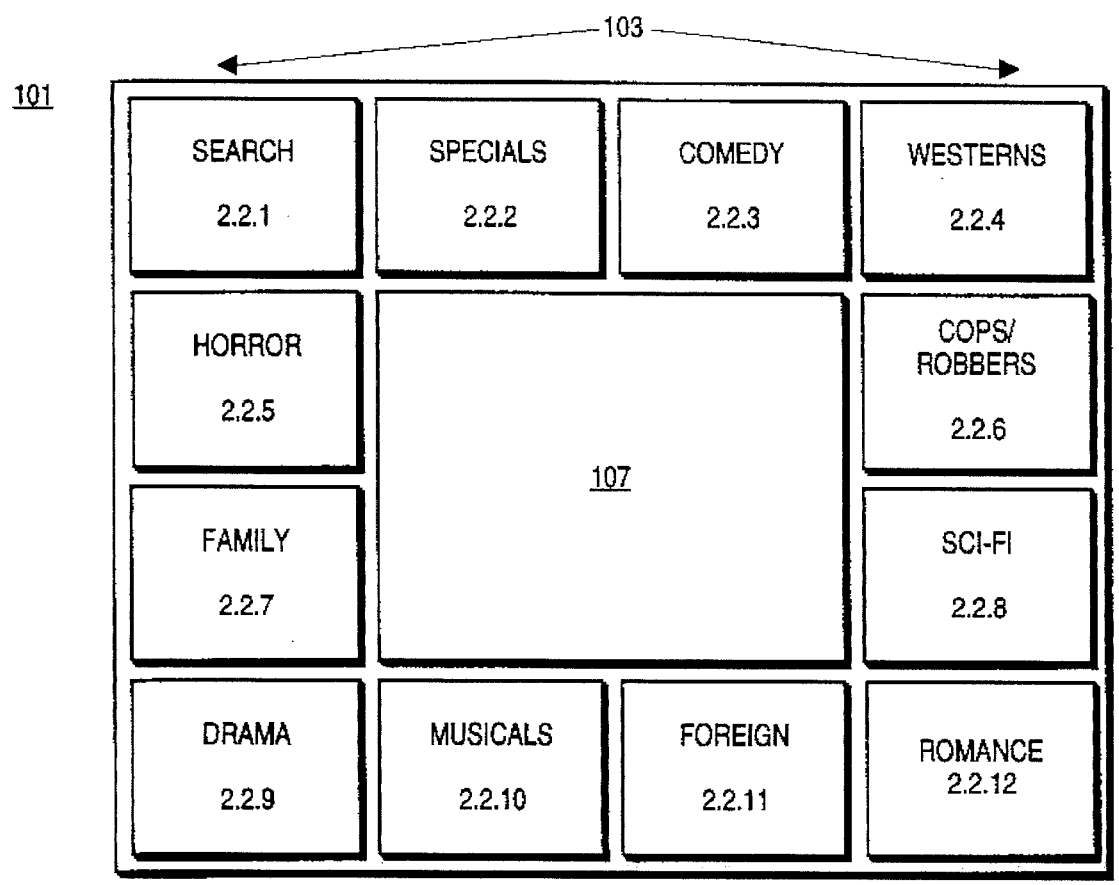
Figure 1E:
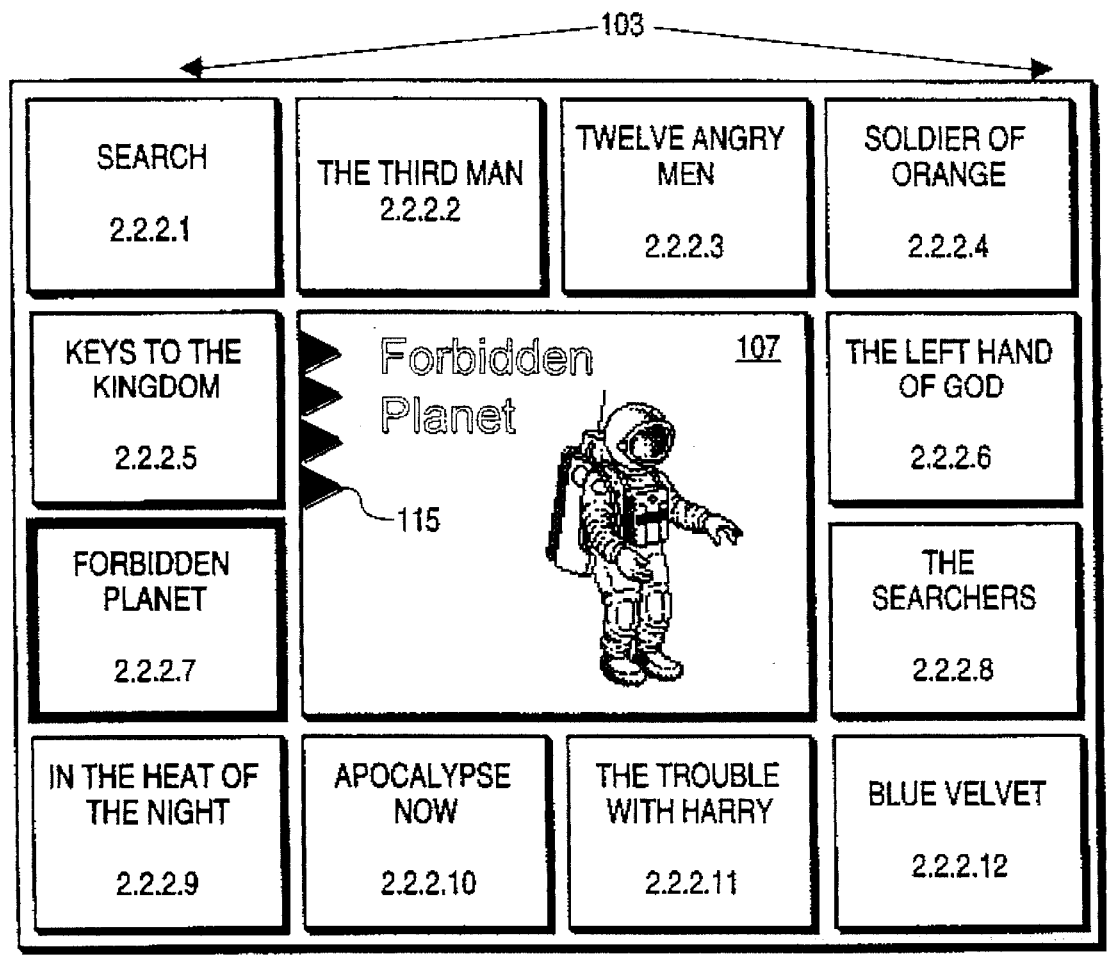

In order to more precisely identify individual cells 105 for the purposes of this specification, the following nomenclature is used when specific cells are referenced. Cells 105 are designated as either parser cells, record cells, search cells, or code cells, followed by a number pattern, in the form of #.#.# ... #, where each digit refers to the serial position (1 through 12) of the cell in the matrix 103, and the position of a digit in the pattern indicates the number of levels down in the database hierarchy, counting the top level as the first level. This pattern uniquely identifies a "path" taken from the first level of the database to reach any individual cell. For example, in FIG. 1B, parser cell 2 refers to the cell in the second serial position in the first level of the database. This parser cell corresponds uniquely to the cell labeled "Movies". Parser cell 12 identifies the last parser cell in the first level of the database, in FIG. 1B labeled "My TV." In FIG. 1C, the cell labeled "New Releases" is uniquely identified as parser cell 2.4, since it is the cell in the fourth serial position of the matrix 103, and it is associated with the second cell in the first level of the database, that is, the "Movies" parser cell. In FIG. 1E, record cell 2.2.2.7 identifies the record cell labeled "Forbidden Planet." When the operation, attributes, or qualities of all cells of given cell type are herein referred to generally, such as "parser cells," the cell reference will be made without the specific identification suffix, since no particular cell in the database is being referenced.

The hierarchical definition of the parser cells also provides a way of defining a plurality of levels in the database. Each parser cell in a level (n) of the database is associated with a matrix 104 of cells in a level (n+1). Accordingly, an nth parser cell is associated with an (n+1)th matrix of cells. A level (n) of the database includes all the matrices of related cells for each parser cell in level (n−1). For example, in FIG. 1B, cells 1 to 12 form the first level of the database, in FIG. 1C cells 2.1 to 2.12 form the second level of the database under parser cell 2, in FIG. 1D cells 2.2.1 to 2.2.12 form the third level under parser cell 2, and so on. Obviously this organization is repeated with respect to each parser cell in FIG. 1B, the first level of the database, providing a regularly hierarchical data structure. The first level of the database may be called the "top" level.

The hierarchical nature of the parser cells allows the database to be organized into a useful variety of topics and subtopics that can be meaningfully presented to a viewer. Because each parser cell is associated with various matrices 104, a parser cell serves as a pointer to topically related information, or records, in the database. For example, FIG. 1B shows parser cell 2 labeled "Movies." This parser cell is associated with the matrix 103 of cells 2.1 to 2.12 in FIG. 1C that categorize the set of all the record cells in the database containing attributes relating to movie type data. Each cell 2.1 to 2.12 is again associated with a subset of other parser cells, record cells, search cells, or code cells, in a lower level of the database. Thus in the illustrated embodiment of FIG. 1C, parser cell 2.2 is associated with the matrix 103 of cells 2.2.1 to 2.2.12 in FIG. 1D, and parser cell 2.2.2 in FIG. 1D is associated with the matrix 103 of cells 2.2.2.1 to 2.2.2.12 in FIG. 1E.

Figure 2:
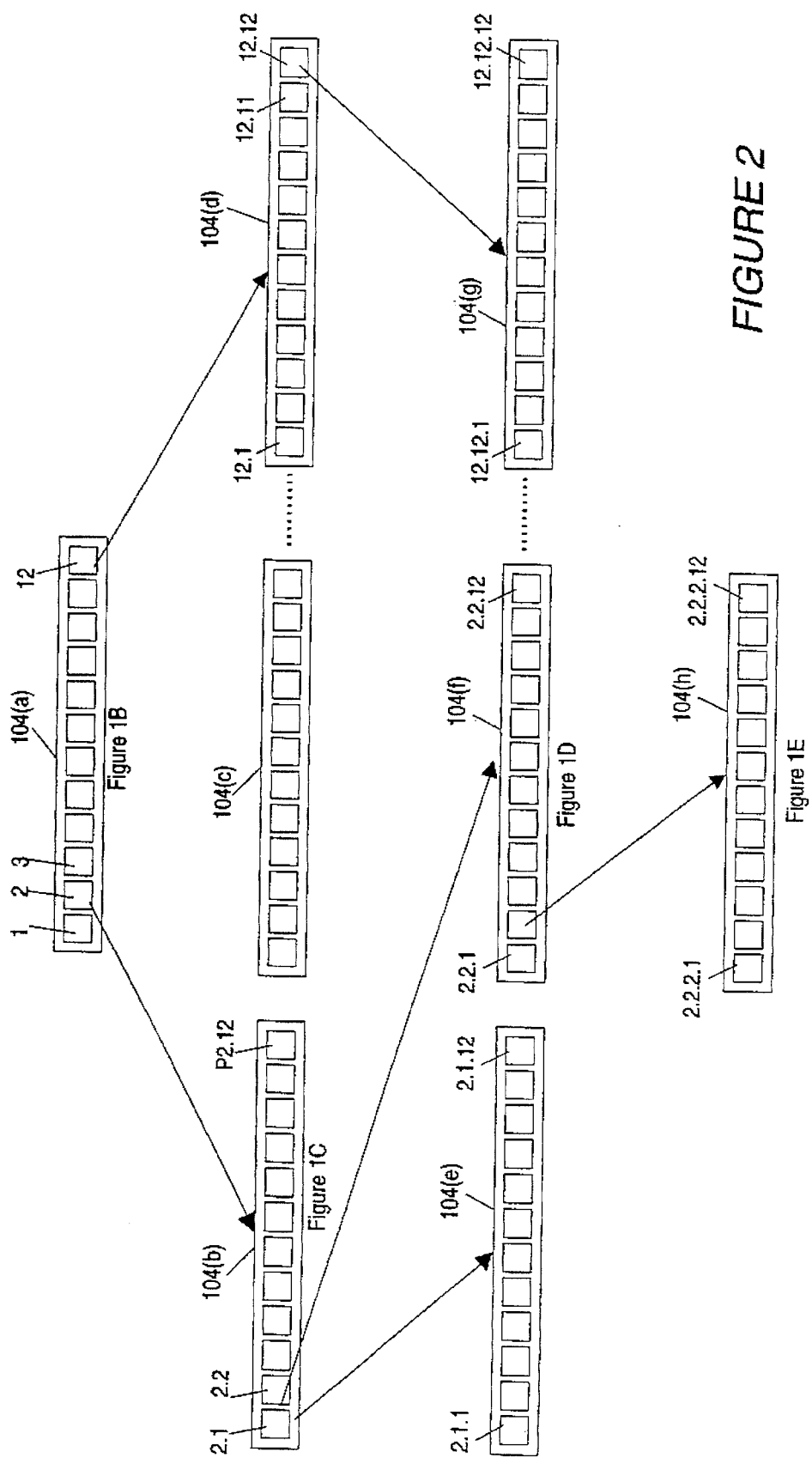
FIG. 2 is an illustration of the hierarchical structure underlying the matrix architecture user interface.

FIG. 2 shows a tree diagram illustrating the hierarchical structure of the database underlying the matrix architecture user interface 101. In FIG. 2 there is shown a number of matrices 104, each including a number of cells 105. The top level of the database is shown as matrix 104(*a*), the second level of the database includes the matrices 104(*b*)–104(*d*)

(other matrices 104 in this level are not shown, but indicated by the dotted line) directly beneath one of the parser cells in the top level matrix 104(*a*). The ordering of the cells in each matrix is as described above, and each illustrated matrix includes the cell numbering for the first and last cells in the matrix. From the illustration, it can be seen that parser cell 2 in matrix 104(*a*) is associated (via the connecting line) with matrix 104(*b*). Matrix 104(*b*) contains cells 2.1 to 2.12, wherein parser cell 2.1 is associated with matrix 104(*e*). Also, in top level matrix 104(*a*), parser cell 12 is associated with matrix 104(*d*), which contains cells 12.1. to 12.12, wherein parser cell 12.12 is associated with matrix 104(*g*). Also shown in FIG. 2, is a mapping, for the purposes of this explanation only, of the matrices 104, with the illustrated matrices 103 of FIGS. 1B through 1E. Thus, matrix 104(*a*) corresponds to the matrix of FIG. 1B, matrix 104(*b*) corresponds to the matrix of FIG. 1C, and so on, as shown.

This hierarchical structure can be repeated extensively to produce a very large database. Even with only five levels in a database organized as above, if there are twelve parser cells in each matrix 104 in each of the first four levels, and record cells only in the fifth level, then there are over 270,000 records available. Adding two more levels increases the available information space to over 39 million records. The matrix architecture user interface provides a convenient means for accessing any record even in such a vast database.

The Cells of the Matrix Architecture User Interface

There are four types of cells 105 used in the matrix architecture user interface 101, each with various distinct characteristics. Parser cells have been previously described as being associated with further matrices 104 of cells 105 to provide the hierarchical structure of the database, and to provide topical indicators of the matrices 104 below the parser cell. When displayed to the viewer, each parser cell has a unique appearance, nominator or sound to enable the viewer to distinguish it from other types of cells. A parser cell may include text, a still graphic, animation, full or partial motion video, audio or any combination of these media data types. In the preferred embodiment, a parser cell is displayed with an icon 113 having a textual overlay 111, the icon 113 being indicative of the topical content of the underlying cells. Thus in FIG. 1B, the parser cell 2 is shown with an icon 113 of a frame from a motion picture reel to indicate that the matrices 104 and cells 105 associated with this cell are related to motion pictures. Other means may be employed to visually distinguish between parser cells and other cells.

Record cells correspond to the individual records of the database, and have attributes including, for example, a title, a media type, various topical categories, and the like, and various datum, such as text, graphic, audio, or video content. Other attributes can be used with record cells as appropriate. Record cells are used to provide direct access to actual content to the viewer when acted upon through the matrix architecture user interface 101. For example, a record cell may be used to directly access a movie, purchase a specific product or service, obtain a specific text item from a periodical, or listen to a recording of a particular artist from any matrix 104 of the matrix architecture user interface 101. In the preferred embodiment, record cells are visually identified in the matrix 103 by a photographic image (not shown) with a textual overlay 111.

Figure 5:
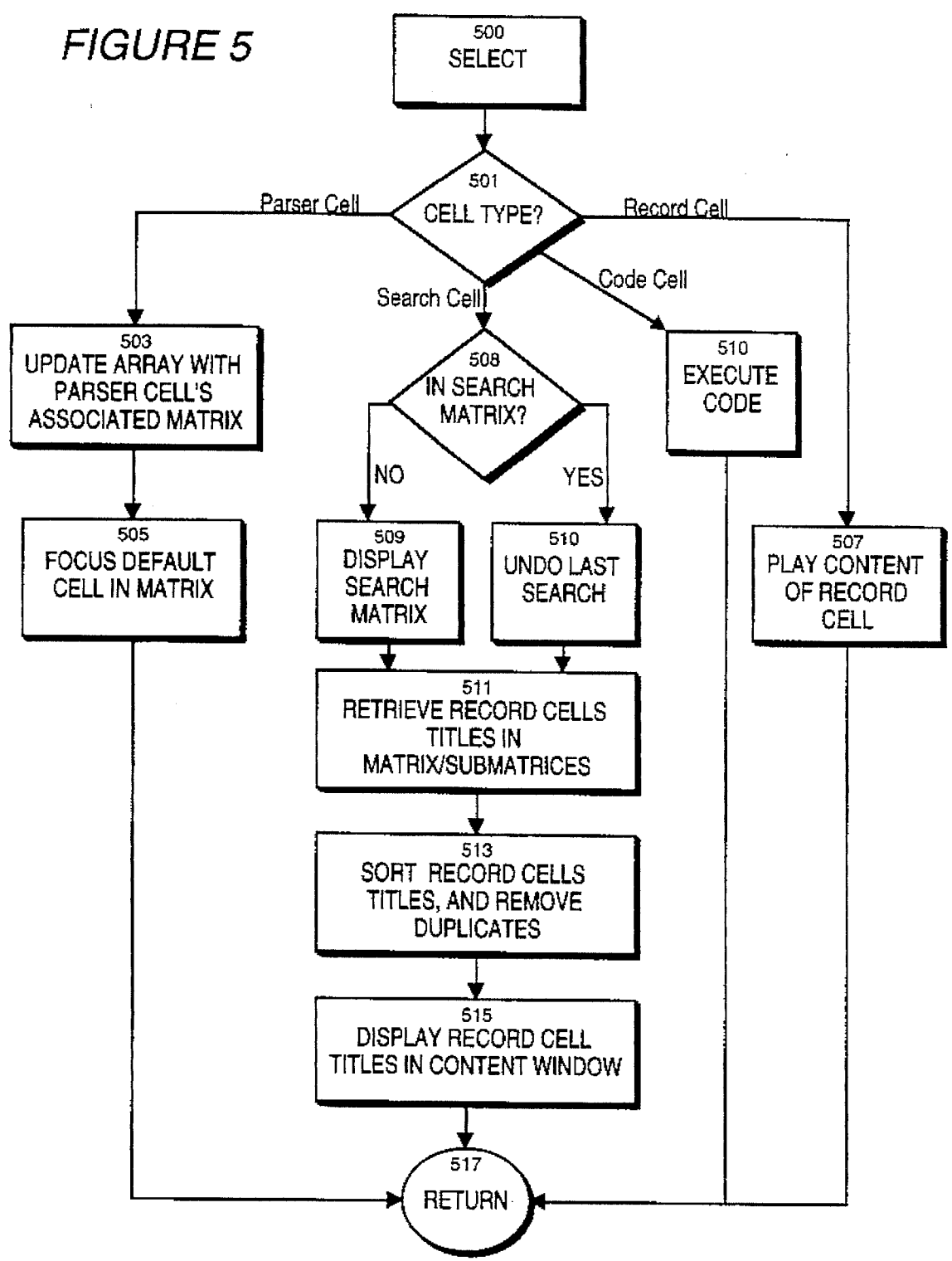
FIG. 5 is a flowchart of the select command.
Figure 6:
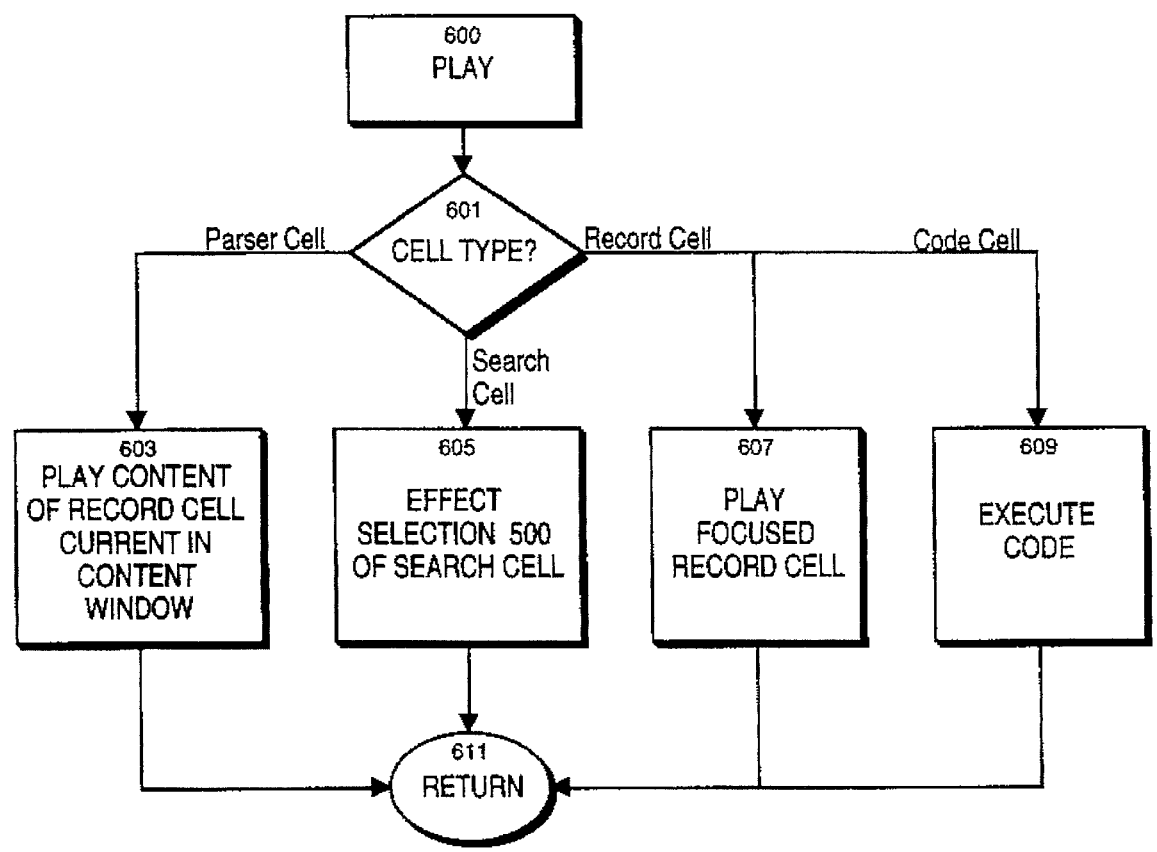
FIG. 6 is a flowchart of the play command.

Code cells are distinct from parser cells and record cells and can include any code entity that accesses selected parts of the database in response to viewer inputs. More specifically, code cells can correspond to software routines that retrieve selected record cells matching search parameters input by the viewer and display the titles of these records cells in the content window 107. These searches can be concatenated to perform searches for records meeting multiple search criteria. The use of code cells for searching is further described below with respect to FIGS. 5, 1G, and 1F.

In addition, code cells may execute code for linking the matrix architecture user interface 101 with other interfaces, for operating computer software applications, or any other interaction driven by executable code. For example, a code cell, when appropriately invoked by the viewer, may cause the execution of a computer game rather than merely retrieving a selected data item. Alternatively, invocation of a code cell may provide access to an entirely distinct interface and operating environment provided by a vendor. Thus a code cell could invoke a commercial on-line service such as America On-Line™, Lexis™/Nexis™, Dialog™, and the like, along with their respective interfaces. In the preferred embodiment, the first serial position of each matrix 104 is occupied by a code cell for performing searching functions on the cells displayed in the matrix.

Figure 1F:
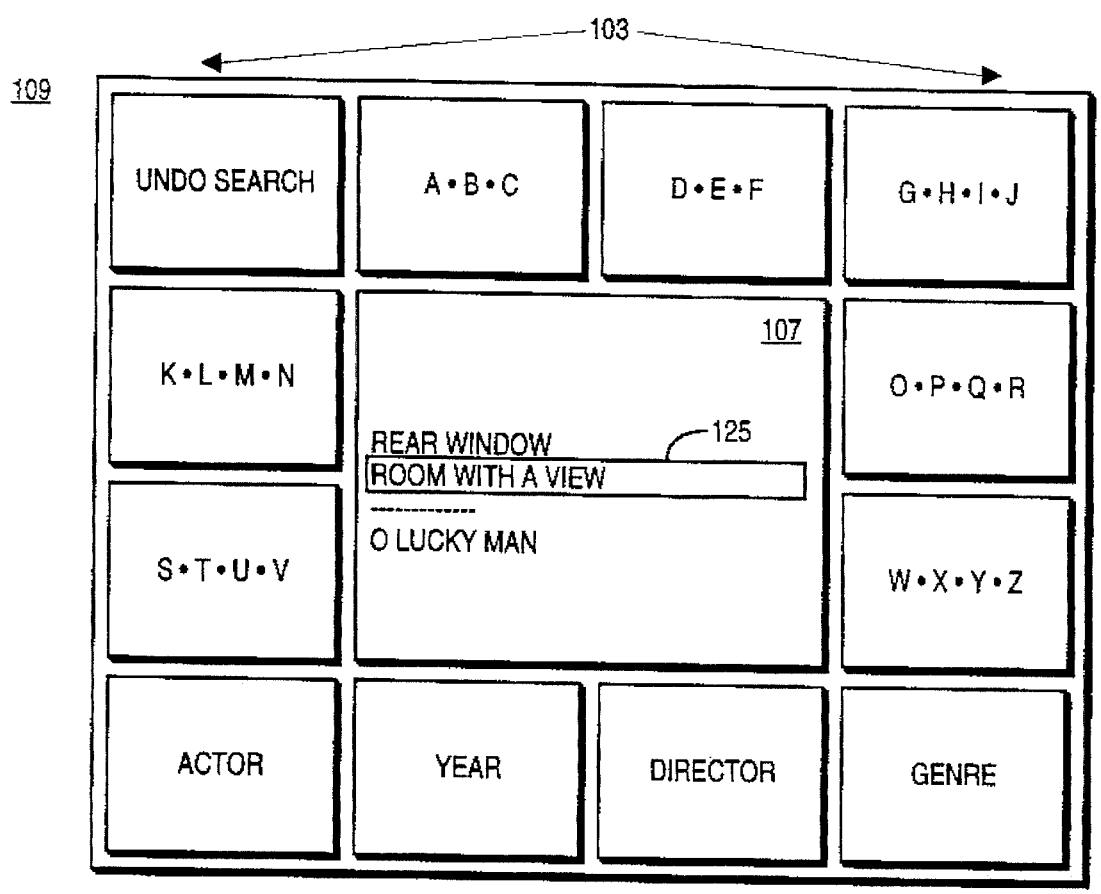

A search cell is used to invoke the display of a search matrix 109 designed for searching the database. An example of the search matrix 109 is shown in FIG. 1F. The search matrix 109 includes a number of code cells for executing specific search or filtering operations. A search cell may also be used to provide direct access to records in other databases not directly included in the matrices 104 of the matrix architecture user interface 101. For example, a merchandise vendor may provide an external database of products and its own proprietary interface, such as a three-dimensional rendering of a store, for accessing records in this external database. The matrix architecture user interface 101 search cells may provide direct access to such records in the external database without the viewer having to use the vendor's proprietary interface to access the records, even though there would be no parser cells or matrices 104 established for that vendor's database. In the preferred embodiment, a search cell always occupies the first serial position of each matrix 104, and all search cells access the same search matrix 109, the operation of which depends on the matrix 104 from which the search matrix 109 is access. The operation of the search cell and the search matrix is further described below with respect to FIGS. 5, 1F and 1G.

Each parser cell and record cell has an associated preview that can be displayed in the content window 107. A preview is a visible and/or audible summary representation of a cell, and may include text, a still graphic, animation, full or partial motion video, audio or any combination of these media. The preview is used to inform the viewer of the nature or content of cell during browsing, without the viewer having to actually retrieve the cell's complete contents. For record cells, the preview contains a presentation of the individual database record corresponding to the record cell. For a parser cell, a preview contains a series of previews of each parser or record cell in the matrix 104 associated with the parser cell. The series of previews for a parser cell may have heterogeneous or homogeneous media types. The operation of the previews in the matrix architecture user interface is further described below with respect to the focus command 400.

A search cell also has a preview associated with it, and includes a video, audio, text, or graphic item identifying the matrix 104 that includes the search cell. For example, the preview of the search cell 2.1 (FIG. 1B) is a text or graphic item indicating to the viewer that the "Movies' matrix 104 is currently being displayed.

The Content Window

The content window 107 is used to display various types of information associated with each of the cells. Specifically, the content window 107 is capable of displaying either a preview of a cell, the actual data content associated with a record cell, a textual listing, such as of any number of cell titles, or any other data or information produced by a code cell, such as a computer application, a video game, or the like. The size of the content window 107 and type of media displayed therein can vary depending on the response characteristics of the service provider's host system, the viewer's display device, the telecommunications network, if any, and the data types in the database. Thus the content window 107 may be enlarged to the entirety of the viewer's display terminal during the display of the content of a record cell, such as the playing of a movie. Contrawise, the size of the content window 107 can be reduced during the display of a preview, to reduce the load requirements on the service provider's host system. The operation of the content window 107 is further described below with respect to the various methods of retrieving information from the cells.

The content window 107 may have a unique appearance, nominator, sound or other identifying characteristic that is selectively associated with one of the parser cells in the top level of the database. These identifying characteristics may be used to indicate the number of levels into the database, from the top level, the current segment, or topical area, or both, that the viewer is currently viewing. For example, the content window 107 may at a given time have four notches 115 on its left edge, indicating that the viewer is viewing cells four levels from the top level. The shape of such notches 115 can correspond to an identical single notch 115 or icon 111 on a parser cell at the top level of the database. The identity between the structure of the notch 115 and the icon 111 or notch 115 informs the viewer of the topical area of the database currently accessed. For example, the four notches 115 in the content window 107 of FIG. 1E may be shown instead with miniature versions of the movie frame icon 111 of FIG. 1B, thus indicating that the viewer is in the "Movies" section of the database, and viewing a matrix 104 four levels down from the top level matrix.

Operation of the Matrix Architecture User Interface

Overview of Operation

Figure 3:
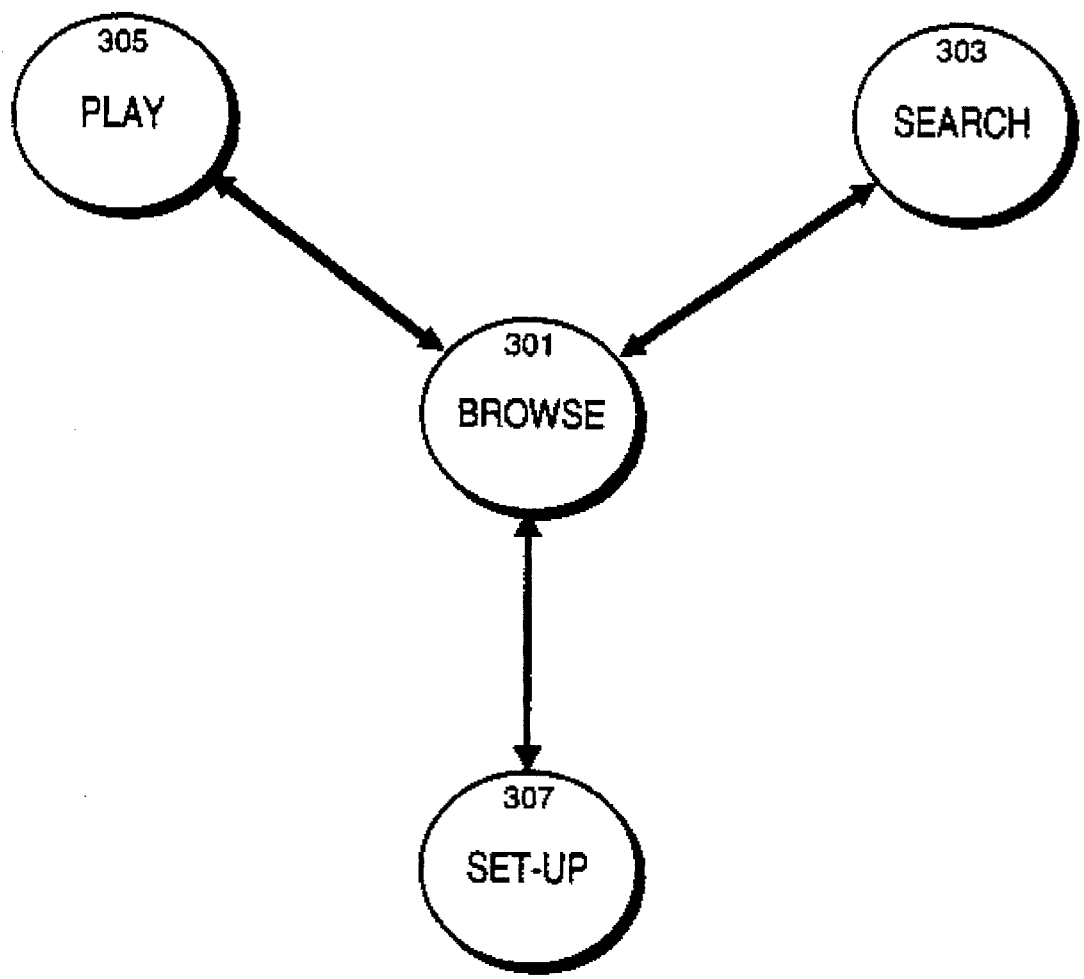
FIG. 3 is an illustration of the modes of operation for the matrix architecture user interface.

Referring now to FIG. 3, there are four basic modes of operation for the matrix architecture user interface, a browse mode 301, a search mode 303, a play mode 305, and a set-up mode 307. The browse mode 301 is used to explore the database hierarchy by navigating to different matrices 104, and displaying various parser cells, record cells, search cells, and code cells in these matrices 104. When the viewer is browsing, previews of various cells currently in the matrix 103 are displayed in the content window 107. This allows the viewer to examine the nature of a record without actually retrieving and examining the record, and continue browsing if the cell is not of interest, or retrieve the cell if it is. Browsing in this manner with the previews of cells instead of the actual content of cells allows the matrix architecture user interface 101 to provide rapid access to any record cell, without substantially increasing the performance characteristics of the service provider's host computer system or a telecommunications link coupling the host to the viewer's system.

In the preferred embodiment, the presentation of previews in the content window 107 occurs automatically without viewer input, in that the matrix architecture user interface 101 sequentially selects and displays previews of cells based only the viewer's current location in the database structure. Because the presentation of previews is automatic, the matrix architecture user interface 101 allows the viewer to "passively search" the database of items of interest, viewing the presented previews, and only selecting for retrieval those items that are desired. Further, browsing allows the viewer to view the content of a record cell at any number of levels below the viewer's current level in the database, thereby avoiding the problems associated with the repeated selection of topics and subtopics in conventional database interfaces.

The search mode 303 is used to locate specific records of interest, by filtering and narrowing a given set of records to a more limited set of records, and allowing the selection of a desired record. Searching allows the viewer to rapidly locate a desired item of interest, bypassing the more casual browsing. The search mode is further described below with respect to the operation of the code cells. The matrix architecture user interface 101 allows the viewer to spontaneously move between the search mode 303 and the browse mode 301, thereby immediately adapting to the viewer's preferred style of accessing the database.

A playback mode 305 is used to display the actual contents of a record that has been located by the viewer in either the browsing or searching modes.

The various modes of the matrix architecture user interface 101 are invoked using a set of command operations and navigational functions. FIGS. 4 through 13 show the basic functions of the matrix architecture user interface. The functions are used to change and effect the modes of the matrix architecture user interface 101, retrieving and displaying the data and previews associated with the various cells of the database. The flowcharts of FIGS. 4 through 9 show the general logic for each of these functions, and can be used for either procedural or object oriented implementations.

Focus Command

Figure 4:
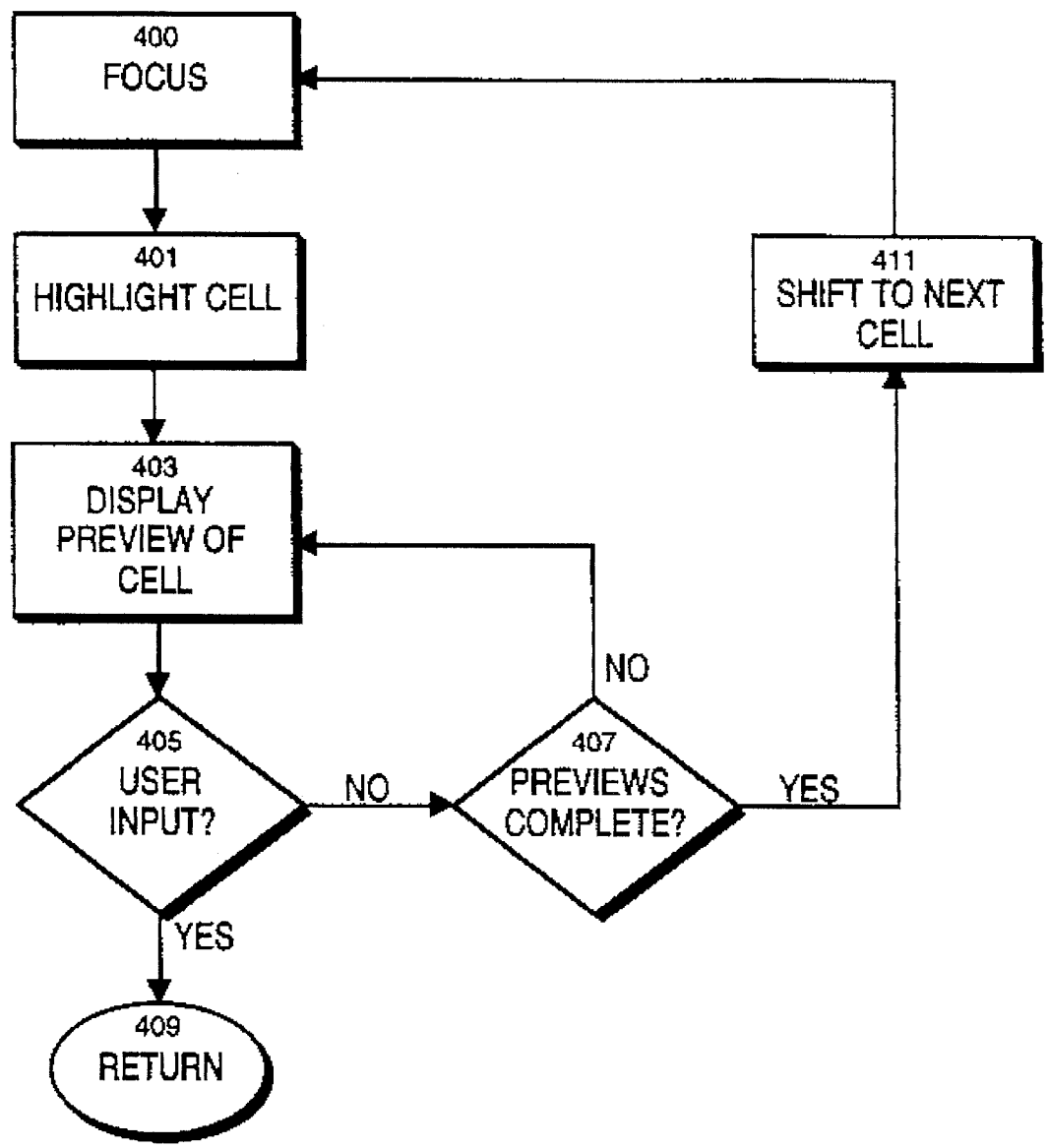
FIG. 4 is a flowchart of the focus command.

Referring now to FIG. 4, there is shown a flowchart for a focus command 400 for effecting the browse mode 301 of the matrix architecture user interface 101. Generally, the focus command 400 allows the viewer to navigate about the database, viewing previews of numerous records related to a focused cell in order to find topics and specific items of interest. Focusing is distinct from actually retrieving the contents of a record, in that focusing narrows the domain or section of the database that is immediately available to the viewer, whereas retrieving records merely retrieves the data of a single record at a time, but provides no opportunity for identifying further records of interest.

In the preferred embodiment, the viewer invokes the focus command 400 with a pointing device using directional controls, such as left or right movement controls, or in alternative embodiments of a pointing device, with various mouse clicks, specific voice commands, touches, or the like. Also, up and down movement controls can be used in other embodiments to effect a focus command 400. Using such movement controls to effect a focus command 400 allows the viewer to alter the currently focused cell, and thereby a current set of previews being displayed in the content window 107. Once invoked, the focus command 400 highlights 401 a displayed cell in the matrix 103. The resulting highlighting 121 of a cell is illustrated in FIG. 1C where the parser cell 2.2 is outlined in gray; highlighting indicates to the viewer that a given cell has been "focused" on, and may be accomplished with a variety of cues, such as color changes, motion changes, audio cues, or the like. For example, in FIG. 1B if a parser cell 2.2 is currently focused, then effecting a right movement with the pointing device will focus 400 parser cell 2.3, causing it to be highlighted 401. If the viewer moves left from the top left cell of a matrix 103, here cell 2.1, the bottom right cell, here parser cell 2.12, becomes focused 400 because of the circular ordering of the matrix 103.

As a cell is highlighted 401, the content window 107 displays 403 a preview associated with the focused cell. The preview of a cell depends on the type of cell that has been focused. As the preview is being displayed, the matrix architecture user interface 101 checks 405 for viewer input, since the viewer may desire to change the currently focused cell, or terminate the current preview, or select the cell being previewed for further retrieval. Accordingly, if there is a viewer input, the matrix architecture user interface 101 returns 409 control to the matrix architecture user interface 101 to retrieve the viewer input, and handle it accordingly. In the absence of any viewer input, previews of cells are continuously displayed to the viewer until completed 407, thereby allowing the viewer to "passively search" merely by viewing each preview as its displayed, until an item or topic of interest is displayed.

As stated, the nature of a preview depends on the type of the currently focused cell. If the focused cell is a record cell, the preview is of that record cell, and is a representation of the content of the record. Thus, for example, if a record cell represents a movie, then the preview may contains selected portions from the film; previews of textual records may contain information identifying author, title, date, and a summary of the text. Previews of audio records may contain a selected portion of the recorded audio. A preview of a record cell informs the viewer of the record's data, without having to examine the database record itself. That is, it provides information about the record, without actually altering the viewer's current location in the hierarchy of the database. This allows the viewer to decide whether to further examine the database record corresponding to the focused record cell, or whether the viewer should continue browsing at the current level of the database.

Where the focused cell is a parser cell, the content window 107 displays 403 the preview associated with the focused parser cell. The preview of a parser cell in a given matrix 104 at a level (n) of the database is a sequential series of previews for each cell in the matrix 104 at level (n+1) associated with the focused parser cell.

If the cell 105 in the matrix 104 at level (n+1) is a record cell, then the preview is as described above. Once completed, a preview of the next cell in matrix 104 at level (n+1) is displayed 403.

If the cell 105 in the matrix 104 at level (n+1) is a parser cell, then the preview is for the first record cell available in a matrix 104 at some level (n+m) below the cell 105 in the matrix at level (n+1). Since the preview of a parser cell is a series of previews, there are at least two ways of determining what the next preview in the series should be. In the preferred embodiment, after the first preview in a series of previews for a parser cell concludes, the next preview is of the next cell in the matrix at level (n+1), and so on for each of the cells in the matrix 104 at level (n+1). The sequence may be formally defined by saying the preview of parser cell j at level (n+1) is a preview of a kth record cell in a matrix 104 at a level (n+m), where j and k are serial positions in a matrix 104, j is incremented through each serial position, and k is constant for each value of j, k being incremented only after j is incremented through all serial positions.

This sequence is shown by the following example. Assume in FIG. 1B, that parser cell 2 has been focused with the focus command 400. This causes the display of a preview of that cell, which is a sequential series of previews of each parser cell 2.1 to 2.12 (FIG. 1C), that is, each cell in the matrix 104 one level below the focused parser cell. The preview of each parser cell 2.1 to 2.12 is the preview of the first record cell in the subset of cells associated with each parser cell 2.1 to 2.12. Thus the preview of parser cell 2.2 is a preview of parser cell 2.2.2. Since this parser cell is associated with the matrix 103 shown in FIG. 1E, the preview of this cell 2.2.2 is the preview of record cell 2.2.2.2, labeled "The Third Man." When this preview is completed, in the preferred embodiment, the next preview is of parser cell 2.3, the preview for which is the first record cell available at some matrix below parser cell 2.3 (this is not illustrated). Following this preview, there would be a preview of each cell 2.4 to 2.12, each one being of a first record cell in some matrix 104 below the associated parser cell.

In an alternative embodiment, another series of previews can be used. Instead of displaying only the preview of one record cell in a matrix 104 at some level (n+m) below the focused parser cell, all of the record cells in that matrix 104 could be displayed 403 until completed. Returning to the example above, the preview of parser cell 2.2 would be the preview of parser cell 2.2.2, which in turn would be the preview of each record cell in FIG. 1E, that is record cell 2.2.2.2 to 2.2.2.12, instead of only one record cell in that matrix. Only when all these previews are completed, would the preview of parser cell 2.3 be displayed in a similar fashion. This alternate sequence can be defined by saying the preview of parser cell j at level (n+1) is a preview of a kth record cell in a matrix 104 at a level (n+m), where j and k are serial positions in a matrix, k is incremented through each serial position, and j is constant for each value of k, j being incremented only after k is incremented for each serial position.

The significant difference between the sequencing of the previews is that the alternate embodiment heavily exposes the viewer to the records provided by the vendors in the first several serial positions, narrowing the viewer's exposure to the database in a given time frame. In other words, in the foregoing example, the viewer would see previews for only movies provided by "HBO™" prior to seeing any movies provided in the "Current Hits" parser cell 2.3, or for any other movie provider. In contrast, the preferred embodiment would show a preview for a movie in each of the parser cell 2.2. to 2.12, thus displaying a preview of a movie offered by each of the movie providers, and thereby giving the viewer the opportunity to choose from a broader set of choices.

In either embodiment, the series of previews is consistently defined, and based on an advertising model that the provider of the matrix architecture user interface 101 can use to determine relative pricing for each of the cells in the matrices 104. That is, the provider may decide upon a model which shows a broad selection of records from the database, and thereby use the preferred embodiment for a series of previews. In such an advertising model, the pricing structure of cells throughout the database may be substantially even (with some variation for the serial position of a cell in a given matrix) since there is a more even distribution of exposure to the various vendors. Alternatively, the provider of the matrix architecture user interface 101 may decide on an advertising model which promotes individual vendors, one at a time, and thereby select the alternate embodiment for the series of previews. In this advertising model, the pricing structure for cell is heavily dependent on the serial position of the cells in their matrices, since cells in the first several positions receive the greatest amount of exposure to the viewer, and thus the provider of the matrix architecture user interface 101 can charge accordingly for these cell locations.

Finally, assuming the completion 407 of all previews for the cells in the matrix 104 at level (n+1), there are again two alternatives as to what cell is to be previewed next. If one preview for each cell in the matrix 104 at level (n+1) has played without viewer interruption, then this suggests that viewer has not seen anything of interest in the category represented by the currently focused parser cell. Thus further displays of similar material are unlikely to be productive in evoking the viewer's interest. Accordingly, in the preferred embodiment, in this situation, the focus is changed 411 to the next cell in the matrix 103 at level (n) that the viewer is currently viewing, by the matrix architecture user interface automatically invoking a focus command 400 along with a directional movement to the right, i.e., towards an increased serial position. A preview of that cell then begins, as described above. Using the example of FIG. 1B, if parser cell 2, "Movies," is focused, and all of the previews have been completed, then the focus is shifted to the next parser cell 3, "Shopping", and previews for this cell begin and are displayed in the manner described. This implementation is consonant with exposing the viewer to the breadth of the database as quickly as possible.

Alternatively, when all previews for the cells in the matrix 104 at level (n+1) are completed, the matrix architecture user interface 101 may loop back, and begin showing previews for another record cell associated with each cell in the matrix at level (n+1). In this embodiment, for example, once a record cell has been previewed for each parser cell 2.2 to 2.12 in FIG. 1B, the next preview would return to parser cell 2.2 and show the preview of record cell 2.2.2.3, in FIG. 1E, labeled "Twelve Angry Men", followed by a preview of a cell 2.3.2.3, followed by a preview of cell 2.4.2.3, and so on, until 2.12.2.3.

A focus command 400 can also result from a timeout, which is an automatic invocation of a function after a specified period of time during which there is no viewer input. If the viewer provides no input 405 to the user interface with the pointing device for the specified period, the matrix architecture user interface 101 will invoke the focus command 400 and the content window will begin to display 403 a series of previews dependent on the currently focused cell. The previews will continue as long as there is no viewer input 405. As stated, during this condition, when the display 403 of a preview or set of previews ends, the focus then shifts 411 to the next cell 105 in the matrix 103. This process continues in an endless loop within the displayed matrix until a viewer input 405 occurs. This automatic cycling of previews provides an attract loop of a constant entertaining stream of media within the content window 107. It enables a passive viewer to browse the database with no direct interaction. It also provides a means for attracting a viewer's attention to specific records of the database of which the viewer might otherwise not be aware, again, because the definition of the sequence of previews allows the matrix architecture user interface 101 to traverse a broad selection of records through the database.

Select Command

The play mode 305 of the matrix architecture user interface 101 allows the viewer to retrieve the actual contents of a record cell. The viewer may invokes the play mode 305 with the select command 500, using the pointing device and conventional "play" or "enter" controls, or in alternative embodiments of the pointing device, with various mouse movements or clicks, voice commands, or the like. The operation of the select command 500 depends 501 on the type of cell that was focused 400 when the select command 500 was invoked.

In the preferred embodiment, the select command 500 is disabled when a record cell is focused, and the actual contents of the record cell are accessed with a play command 600 only. In alternative embodiments, the select command 500 is enable in this situation, and if a focused record cell is selected, then the content window 107 displays 507 the data associated with the focused record cell. Thus, selecting 500 a record cell allows the viewer to view the entire contents of the record associated with the record cell. This will occur where the viewer has focused 400 a record cell of interest, displaying the preview associated with the record cell in the content window 107. If after a few moments of watching the preview, the viewer decides to view the entire record associated with the record cell, the viewer can then invoke the select command 500 and the entire contents of the record are displayed 507 in the content window 107. If the record was a movie, for example, the movie would begin "playing" from the beginning. In embodiments where the size of the content window 107 is variable, the content window 107 can be increased to a predetermined size, such as a maximum size, during display 507 of the record cell.

If a parser cell in level (n) is focused 400 (nth focused parser cell) when the select command 500 is invoked, then the matrix 103 shown to the viewer is updated 503 with the cells in the matrix 104 at level (n+1) associated with the focused parser cell. The nth focused parser cell and the other cells in the matrix 103 are removed, and replaced by the cells in the matrix 104 at level (n+1). After the matrix 103 is updated 503, a focus command 400 focuses on a default cell in the matrix 103.

As stated, each parser cell is associated with a matrix 104 of topically related cells. In each matrix 104 there is designated a default cell. In the preferred embodiment, the default cell has a consistent location in the matrix 103, preferably in the top left position. The default cell is automatically focused when the matrix 103 is updated 503 following the selection 500 of a focused parser cell. Because a focus command 400 results in the display 403 of a preview of the focused cell, selecting 500 a parser cell accordingly causes the preview of the default cell to be displayed in the content window 107. This function thus results in the viewer immediately seeing previews of the cells associated with the previously focused parser cell.

For example, assume a viewer has focused 400 on parser cell 2 at level one of the database, which represents the "Movies" segment of the database. Previews of various record cells some number of levels down in the database are then displayed 403 in the content window 107, the previews continuing while there is no viewer input 405. At some point, the viewer decides to watch a movie, but wants to see what other movies are available for viewing, having not seen a preview of a movie that appears interesting. The viewer uses the pointing device to invoke the select command 500, and selects parser cell 2. The matrix 103 is updated 503 to show the cells 2.1 to 2.12 in a matrix 104 second level of the database associated with the focused parser cell 2. The default cell in this matrix 103 is automatically focused 400, and the preview of that default cell is displayed 403 in the content window 107.

In conjunction with the previewing function of the focus command 400, the select command 500 provides a powerful tool for efficiently browsing the database. The viewer repeatedly focuses 400 on the various parser and record cells at a given level (n) of the database, viewing in the content window 107 the displayed 403 previews from cell at various levels throughout the database. At the higher levels of the database, the previews will show divergent types of subject matter, using the preferred sequencing of the previews. For example, focusing on the various parser cells of FIG. 1B would display to the viewer previews from various topical areas, such as movies, shopping, sports, and the like. Upon seeing a topical area or record of interest, the viewer can select 500 the appropriate parser cell, and see the updated 503 matrix 103 associated with the selected parser cell. Thus selecting 500 parser cell 2 would update 503 the matrix 103 with cells 2.1 to 2.12. Focusing 400 again on the various cells of interest with the pointing device, the viewer now sees previews for a more narrowly defined topical area, as determined by the selected parser cell, in this example, only cells included under the "HBO" parser cell 2.2. Again, upon seeing a preview of a further subtopic of interest, the viewer may select 500 a parser cell at that level, and then be presented with an updated 503 matrix 103 of cells from the matrix 104 in level (n+1) associated with the selected parser cell.

This process of focusing 400 and selecting 500 repeatedly allows the viewer to rapidly descend down through multiple levels of a database, while "seeing" the contents of the lower levels with the previews before actually entering them. This process contrasts to conventional hierarchical menus, where the viewer can only determine the contents of one given level of the database at a time, with no ability to view the contents of lower levels prior to actually entering them.

If a code cell is focused 400 when the select command 500 is invoked, then a code operation associated with the cell is executed 510. This code operation can include retrieving specific data from the current database, execution of other computer applications, including interfacing with other databases or service providers.

If a search cell is focused 400 when the select command 500 is invoked, then the search mode 303 of the matrix architecture user interface 101 is entered whereby the viewer can search for records having a specified attribute, or set of attributes via concatenated searching. Specifically, if the viewer is not currently in the search mode 303, then a search matrix 109 (FIG. 1F) is displayed 509 to the viewer, including a variety of code cells for executing specific searching or filtering operations of record cells having specified attributes.

As stated above, code cells can include code used to filter the records in the database according to the level of the database the viewer is currently viewing in the matrix 103. That is, in the preferred embodiment, the search matrix 109 is matrix sensitive and provides for searching only those record cells at or below the matrix 104 from which the search matrix 109 was accessed. The filtering of record cells available for searching through the search matrix 109 in relation to the matrix 104 that the viewer is currently viewing produces what is called a linearized subtree. A linearized subtree is an ordered set of records resulting from the implicit designation of a specific set of matrices 104 in the database as the searchable set of records when a search cell in a given matrix 104 is selected. The linearized subtree of records may be listed for the viewer in the content window 107, and may be further narrowed and filtered with additional searches.

Referring to FIG. 2, for example, if the search matrix 109 is invoked via a search cell when the viewer is currently viewing the matrix 104(b), then the search matrix 109 and all the code cells therein allow for searching only those record cells in matrix 104(b), and the submatrices of the parser cells 2.1 to 2.12 in matrix 104(b); matrix 104(b) and its submatrices thus form the subtree available for searching. This matrix sensitive searching, in conjunction with the focus and select commands, allows the viewer to very rapidly narrow the database to a set of record cells of interest, and then search within that set until a specific record cell is located for retrieval.

Figure 1G:
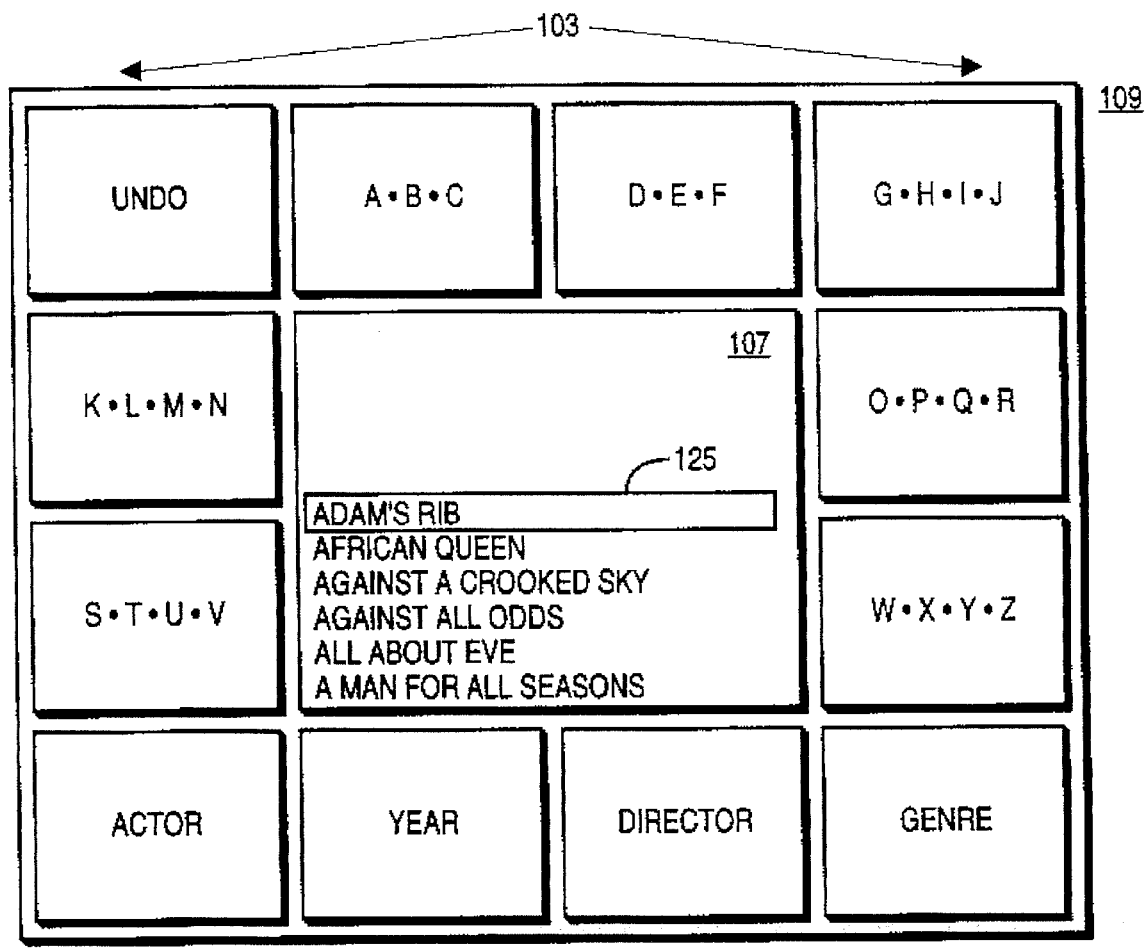

Assume for example that the viewer is currently viewing the matrix 103 shown in FIG. 1D, which represents the "HBO™" set of movies. If the search cell 2.2.1 is focused 400 and then selected 500, the search matrix 109 is displayed 509, showing a set of code cells, and optionally additional parser cells or record cells. The search mode 303 of the matrix architecture user interface 101 is invoked, retrieving 511 an attribute (here the title) of all record cells in the matrices 103 and 104 at or below the "HBO™" parser cell 2.2. That is, selecting a search cell at a given level (n) of the database retrieves 511 the titles of all of the record cells in matrices 103 and 104 at and below that level (n) of the database. The titles are then sorted 513 and duplicates are eliminated. Duplicates are possible because the same record cell may be present in multiple different matrices. For example, the record cell for the movie "Forbidden Planet" may occur in both the matrix 104 for "HBO™ Specials" and the matrix 104 for "Sci-Fi." The sorted list is then displayed 515 in the content window 107, beginning with the title of the first record cell. A highlight bar 125, or equivalent cue, is used to indicate the first listed title. An example of the resulting display is shown in FIG. 1G.

The use of duplicate cells results in increased storage efficiency since each cell may act as a pointer to a single record. Further, the use of duplicate cells allows the service provider to offer additional exposure to product or service vendors for promotion of their offerings. Thus, instead of being limited to display of the cells in a particular matrix related to the vendor's products, a vendor may also have cells for its products located in any matrix 104 in the database, thereby increasing its exposure to the viewer. The provider of the matrix architecture user interface 101 can incorporate this placement of duplicate cells in its advertising model.

Once the list of record cell titles is displayed 515, the viewer is able to perform further searches by selecting 500 various code cells present in the search matrix 109. These further searches are concatenated, such that the results of each search further narrow the list of titles, thus allowing the viewer to more easily identify a specific record cell. The concatenated searching is done by first focusing 400 on one of the code cells in the search matrix 109 that represent alphabetical or other filtering parameters, and then selecting 500 that cell. For example, focusing 400 and selecting 500 the code cell designated "D●E●F", will effect a filtering operation that retrieves 511 only those record cell titles from the displayed titles that begin with any of the letters D, E, or F. Such alphabetical code cells thus operate to further narrow the list of titles displayed. The viewer may scroll through the displayed list using controls on the pointing device, or equivalent controls, for moving up or down the list. The list is circular in that scrolling past the last title in the list returns the viewer to the first title. Each time the viewer scrolls in the list, a title is highlighted. The viewer may invoke a play command 600 to retrieve the actual contents associated with the highlighted record cell.

In addition to the alphabetical code cells which search for the title attribute of a record cell, categorical code cells may also be used to filter the displayed list of record cells with respect to other attributes. For example, selecting 500 the "Actor" categorical code cell in FIG. 1F would display in the content window 107 a listing of actors in the record cells in the displayed list of titles. The viewer could then select an actor by name by scrolling through the list in the content window 107, or may narrow the list of actors by selecting one of the alphabetical list cells. Upon selection of a particular actor's name, all the movies in the database at or below the current level that include that actor would then be listed in the content window, or alternatively, a matrix 103 of movies with that actor would be displayed. Again the viewer may select from the list or matrix 103 to display the contents of the listed movies.

The viewer may exit the search mode 303 at any time by invoking a back command 810 (described below). This results in returning to the previous matrix 103 from which the search matrix 109 was invoked, resulting in the appropriate cells of the previous matrix 103 being displayed to the viewer. For example, assume the viewer is viewing the search matrix 109 in FIG. 1F following the selection of the search cell of the matrix 103 in FIG. 1D. If the viewer then decides to cancel the searches and return to the matrix in FIG. 1D, the viewer invokes a back command 810, the matrix architecture user interface 101 updates 503 the matrix 103 with the appropriate cells, here the matrix shown in FIG. 1D. A focus command 400 is sent to the default cell as discussed above.

The viewer may also wish to undo individual search requests from a set of concatenated search requests. This is done by focusing 400 on the first cell in the search matrix 109 and selecting 500 this cell. Since the viewer is currently in the search matrix 109 (step 508), The matrix architecture user interface 101 then cancels 510 the last search request, and displays 511 the appropriate matrix 104 or title list in the content window 107 showing the results of the previous search.

Play Command

The play mode 305 of the matrix architecture user interface 101 may also be invoked with a play command 600. The play command 600 directly displays the contents of a record cell that is either focused 400 or for which a preview is being displayed 403 during the display of the previews of a focused parser cell. That is, anytime a preview of a cell is being displayed 403 in the content window 107, whether that cell is at the current level or any number of levels below the current level of the database, the viewer may retrieve the contents of the record directly by invoking the play command 600 without having to traverse down to lower levels of the database to focus on the desired record cell. The play command 600 is invoked by the pointing device with a "play" control or the like.

As with the select command 500, the effect of the play command 600 depends on the type of currently focused cell. If a record cell was focused 400 when the play command 600 is invoked, then the contents of that record cell are played 607 in the content window 107. For example, if the record cell corresponding to the film "Forbidden Planet" in FIG. 1F was focused 400, then content window 107 would be displaying 403 the preview for that record cell. If while viewing the preview, the viewer then decides to watch the entire film, the viewer invokes the play command 600, which causes the content window to display 607 the contents of the record cell from the beginning. In embodiments where the size of the content window 107 is variable, the content window 107 can be increased to a maximum size during display 607 of the record cell.

If a parser cell is focused 400, and thus there is a preview of a record cell displayed 403 in the content window 107, invoking the play command 600 displays 603 the content associated with record cell being previewed 403. Returning to the example of FIG. 1B, assume that parser cell 2 has been focused with the focus command 400, and that the previews for the matrix 104 associated with the parser cell 2 are being displayed in the content window 107. As described above, this may include the preview of a record cell multiple levels down in the database, such as a preview of record cell 2.2.2.2, labeled "The Third Man." During the preview of "The Third Man," the viewer may decide to view the entire film. The viewer then invokes a play command 600, and the entirety of the film is shown in the content window 107, with the content window 107 increasing in size where so enabled. The playing of the contents of record cell the preview of which is displayed in the content window 107 may be formally defined by saying the the viewer may retrieve (play) the contents of a record cell in a matrix 104 at a level (n+m) below the currently focused parser cell at level (n), where only cells 105 from the matrix 103 at level (n) are currently displayed.

This feature of the play command 600 allows the viewer to "jump" past any number of database levels, directly to a specific database record, and view the contents of that record immediately, without having to review, and interact with a large number of intermediate menus. This is a considerable improvement over existing methods of database access that do not allow bypassing multiple levels in database. In conjunction with the focus 400 and select 500 commands, the play 600 command allows the passive viewer who is not interested in actively searching for specific files, to simply designate topic areas by focusing and selecting, and then pick a specific database record as its preview is being displayed 403.

If the viewer is in the search matrix 109, then the play command 600 is used to retrieve and display the contents of a record cell that is highlighted 125 in the the content window 107. This allows the viewer to retrieve the contents associated with record cells that meet the various search parameters input by the viewer. Thus in FIG. 1G, the viewer can display the contents of the film "Adam's Rib" by invoking the play command 600.

In the preferred embodiment, the play command 600 is not enabled if a search cell or code cell is focused, the operation of these cells being invoked only with the select command 500. In alternative embodiments, it is possible to enable the play command 600 by interpreting 605 the play command 600 when a search cell is focused as a select command 500 and effecting the resulting operation for the selection of a search cell. Similarly, if a code cell was focused 400, then the code associated with the code cell is executed 609.

Stop Command

Figure 7:
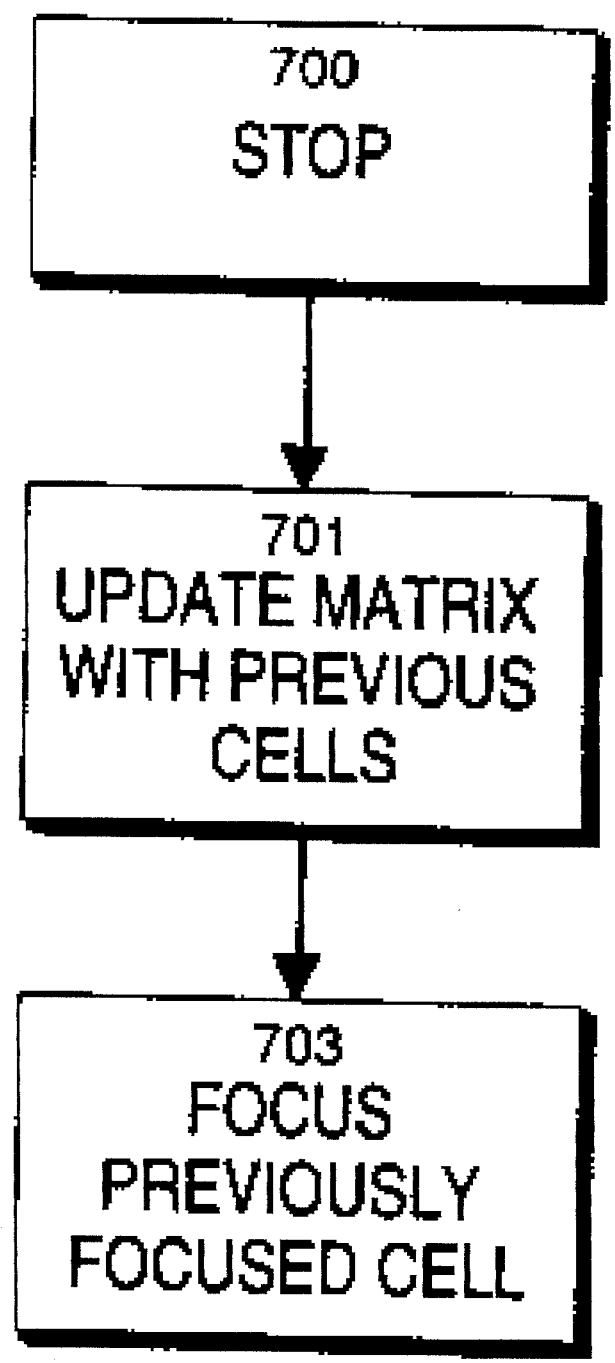
FIG. 7 is a flowchart of the stop command.

A stop command 700 is used to stop, or terminate the display of the content of a record cell resulting from a play command 600. FIG. 7 illustrates a flowchart of the logic of the stop command 700. When invoked, the stop command 700 updates 701 the matrix 103 to display the cells that were displayed when the play 600 command was invoked. The cell which was focused 400 when the play command 400 was invoked is focused again 703, and accordingly, the preview of that cell is displayed 403 in the content window 107.

Movement Commands

Figure 8:
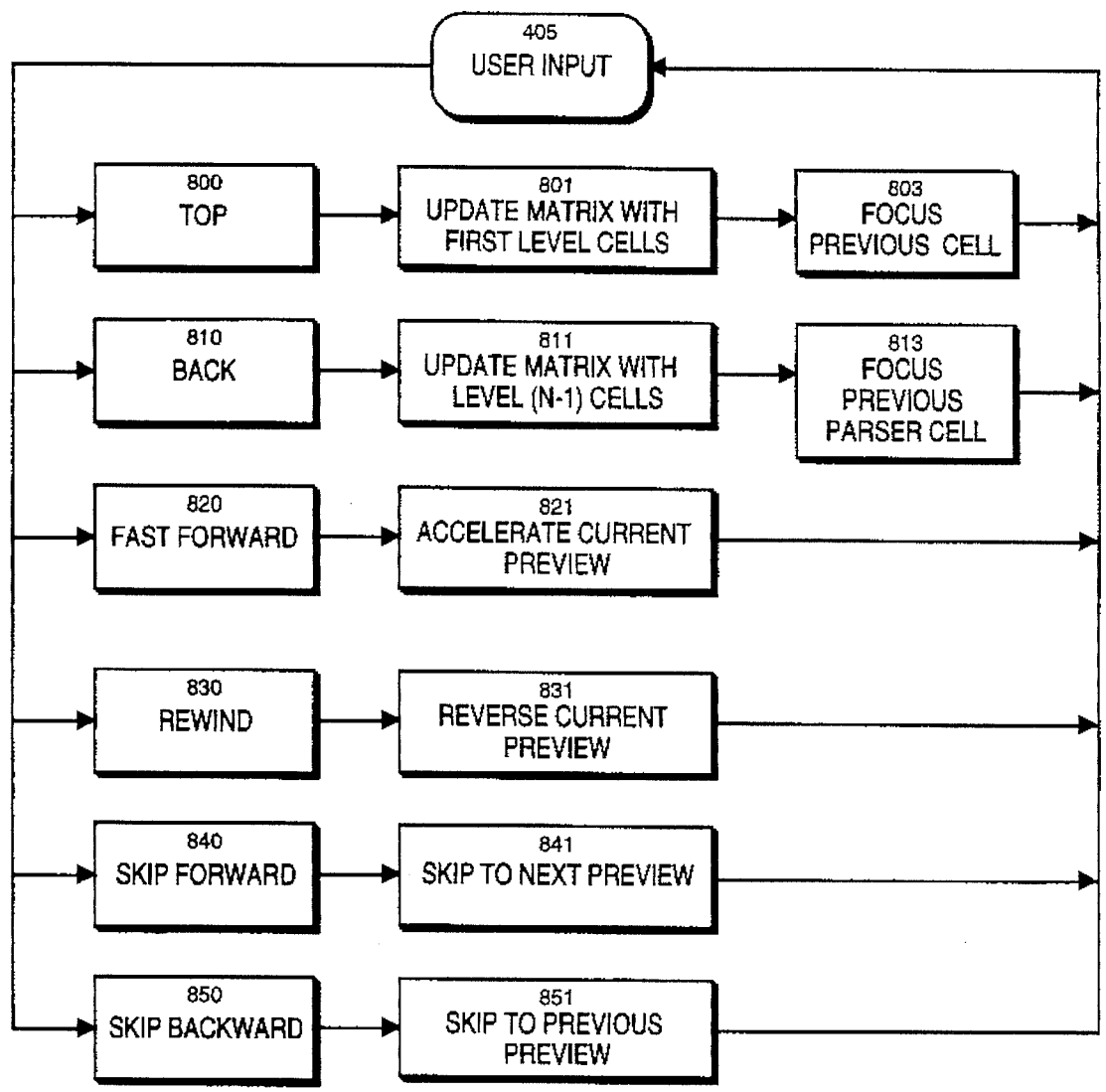
FIG. 8 is a flowchart of various movement commands.

In addition to the above described commands, the matrix architecture user interface 101 provides a number of other commands for navigating the database. Referring now to FIG. 8, there is shown a flowchart of movement commands including a top command, a back command, fast forward command, rewind command, skip forward command, and skip backward command. These commands provide control over the speed of the browse and play mode operation, and movement through the database hierarchy.

The top 800 and back 810 commands allows the viewer to move back up the levels of the database. Top command 800 updates 801 the matrix 103 to display the top level of the database hierarchy from whatever matrix 104 at level (n+m) is presently displayed. Thus, if the matrix 103 currently contains record cells shown in FIG. 1F, invoking the top command 800 updates 801 the matrix 103 to display the first level parser cells 2 to 12 of FIG. 1B. Once the top level matrix 103 of parser cells 2 to 12 is displayed, in the preferred embodiment the parser cell (here parser cell 2) which was previously selected 500 in entering level (n+m) is again focused 803, and thus the preview associated with that cell is displayed 403 in the content window 107 as a direct consequence of the focus command 400.

Back command 810 operates similarly, but goes only one level back up the database. When invoked at the (n+m)th level, the back command 810 updates 811 the matrix 103 to display a matrix 104 of cells at the (n+m−1)th level of the database associated with the parser cell that was selected 500 to display 503 the matrix 104 of cells at the (n+m)th level. A focus command 400 is invoked 813 for the parser cell that is associated with the lower level matrix 104. For example, if the viewer is currently viewing the matrix 103 in FIG. 1F and invokes the back command 810, then the matrix 103 is updated 811 to display the matrix 103 shown in FIG. 1E, and the parser cell 2.2 is focused 400.

Fast forward command 820 accelerates 821, in a manner resembling the "fast forward" on a video cassette recorder, the display 403 of a preview in the content window 107 or the display 507 of the contents of a record cell, if appropriate. If this command is invoked and maintained with the pointing device or equivalent controls, the preview of a next cell will be displayed 403 at an accelerated speed after the preview of a currently focused cell ends. If the command is invoked continuously, the contents of the previews for the focused parser cell are played in "fast forward" mode in an endless loop. This allows viewers to rapidly view a number of previews to determine if they are interested in any of the represented records.

The rewind command 830 reverses 831, in a manner resembling "rewind" on a video cassette recorder, the contents of the current preview displayed 403 within the content window 107. If this command is invoked and maintained, the contents of the previous preview, beginning at its end, will play backwards at "rewind" speed after that of the current preview ends. If the command is invoked continuously, the contents of the previews within the focused parser cell's matrix 104 play backwards in "rewind" mode in an endless loop.

The skip forward command 840 "jumps" forward 841 from the currently displayed preview to the beginning of the next preview within the focused parser cell's underlying matrix 104 and begins that preview. Repeating this command cycles forward through each preview within the focused parser cell's matrix 104 in an endless loop.

The skip backward command 850 "jumps" backwards 851 from the currently displayed preview to the beginning of the previous preview within the focused parser cell's underlying matrix 104 and begins that preview. Repeating this command cycles backward through each preview within the focused parser cell's underlying matrix in an endless loop.

User Configurable Matrix

A further aspect of the invention of the matrix architecture user interface 101 is the ability to integrate the functionality of the interface with a number of user configured matrices. The viewer is able to configure and access a personal matrix that contains selected parser cells and record cells from anywhere in the underlying database. This allows the viewer to even more quickly access record cells or parser cells that are frequently used.

Figure 1H:
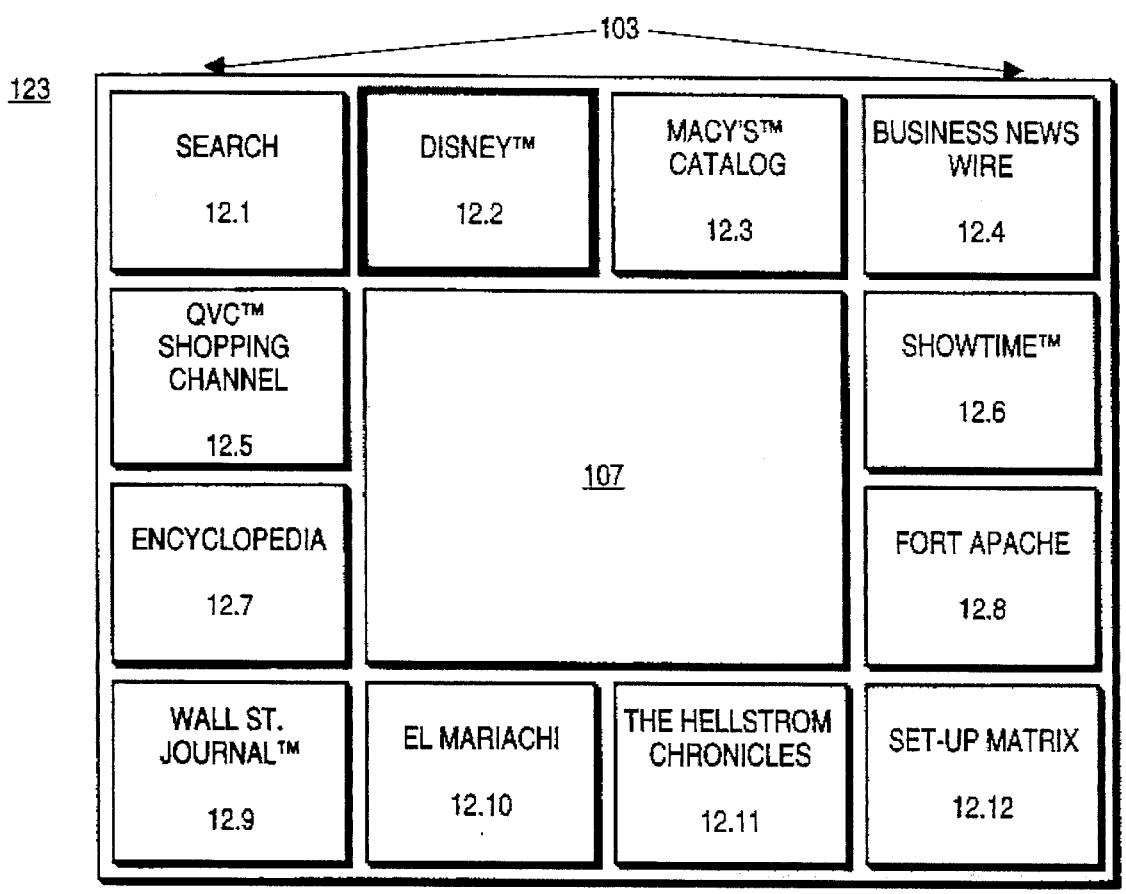

In the preferred embodiment, the top level matrix 103 contains a user configured parser cell associated with a user configured matrix. In the illustration of FIG. 1B, user configured parser cell 12 is labeled "MyTV," and is associated with the user configured matrix in this embodiment. The viewer accesses this parser cell and its underlying matrix 104 in the same fashion as any other cell in the matrix architecture user interface 101, via the focus, select, play, and related commands. In the manner described above, focusing 400 on the user configured parser cell 12 displays 403 a preview of the user configured matrix 123, as described above, that is a series of previews of each cell in the viewer configured matrix 123. When the user configured parser cell 12 is selected 500, the user configured matrix 123 is displayed 505, and the default cell is focused 400. An example of one possible user configured matrix 123 is shown in FIG. 1H.

Figure 9:
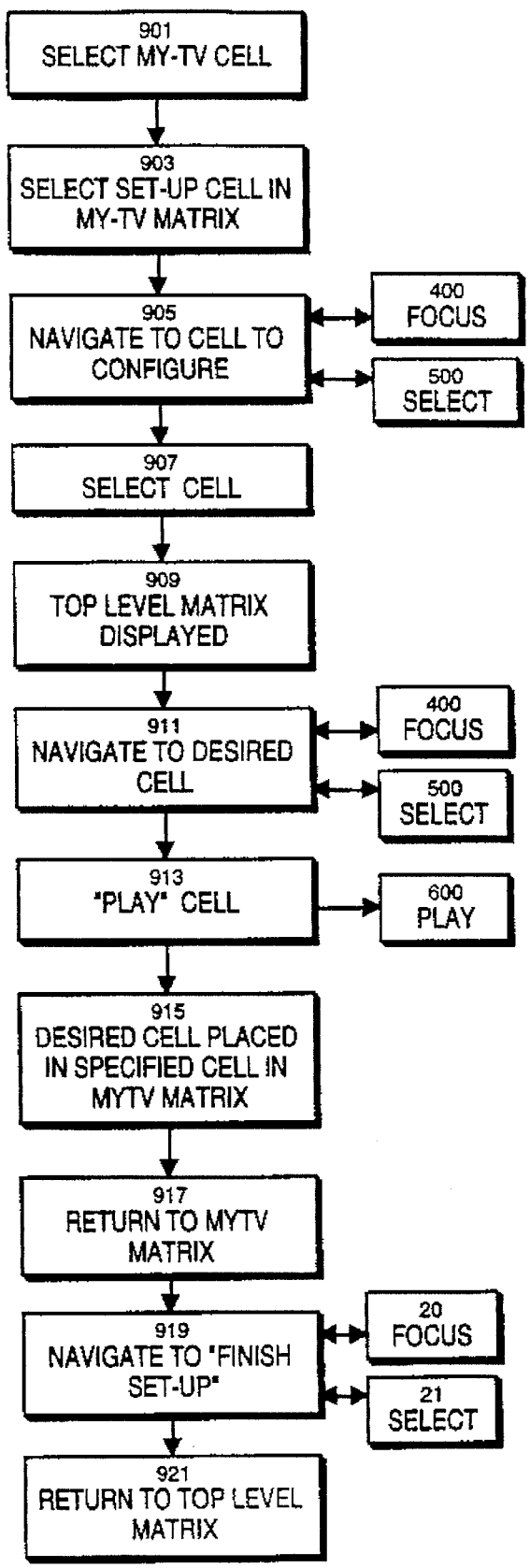
FIG. 9 is a flowchart of the set-up mode for the user configured matrix.

The user configured matrix 123 associated with the user configured parser cell 12 is configured by the viewer with a set-up code cell 12.12 (FIG. 1H) that places the matrix architecture user interface 101 into its set up mode 307 when selected 500. The viewer can then assign record cells or parser cells from anywhere in the database to the cells in the user configured matrix 123. A flowchart of the configuration process is shown in FIG. 9, beginning with the selection 901 of the user configured parser cell.

After entering the user configured matrix 123 by invoking 901 a select command 500 on the user configured parser cell, the viewer enters the set up mode 307 by invoking 903 a select command 500 on the set-up code cell 12.12. On selecting this cell, the cell name is changed to read "Finished Set-Up." Once in the set up mode 307, the viewer navigates 905 to the cell in the user configured matrix that is to be changed by using the focus command 500 to move to the specified cell. The viewer effects 907 a select command 500 to designate that cell for reconfiguring. Because the matrix architecture user interface 101 is in the set-up mode 307, the select command 500 is interpreted as a designation of the cell for reconfiguration, rather than a request to retrieve the contents of the cell. The top level matrix 103 (FIG. 1B) is then displayed 909 to the viewer. This allows the viewer to navigate 911 to any cell in the database, using the focus command 400 and the select command 500, and any of the movement commands described above. The cell of interest can be either a parser cell or a record cell. Choosing a parser cell for inclusion in the user configured matrix 123 will give the viewer immediate access to the matrix 104 associated with that parser cell, regardless of where that matrix 104 resides in the database. Choosing a record cell for inclusion will give the viewer immediate access to the record cell.

After the viewer has navigated 911 to the desired cell, the viewer then invokes 913 a play command 600 to designate the cell for inclusion. Since the matrix architecture user interface 101 is in the set up mode 307, the play command 600 is interpreted as a request to place 915 the desired cell in the user configured matrix 123, rather than as a request to retrieve the contents of the cell. Accordingly, the desired cell is placed 915 in the user configured matrix 123 at the serial position previously designated by the viewer. The user configured matrix 123 is then displayed 917, showing the viewer that the desired cell has been placed correctly. Should the viewer desire to reconfigure another cell in the user configured matrix 123, the viewer can repeat the above process, beginning with navigating 905 to the cell to be changed. At any time during the set-up process, the viewer may invoke the back command 810 to terminate the configuration, and return to the user configured matrix 123, or by navigating 919 to, and selecting 500 cell 12.12, the "Finished Set-Up" cell. This returns 921 the returns the viewer to the browse mode 301 in the matrix 103 at top level.

In the preferred embodiment, during the use of the set-up mode, various instructions are displayed in the content window 107 to guide the viewer during the set-up process.

Implementation of the Matrix Architecture User Interface

Figure 10:
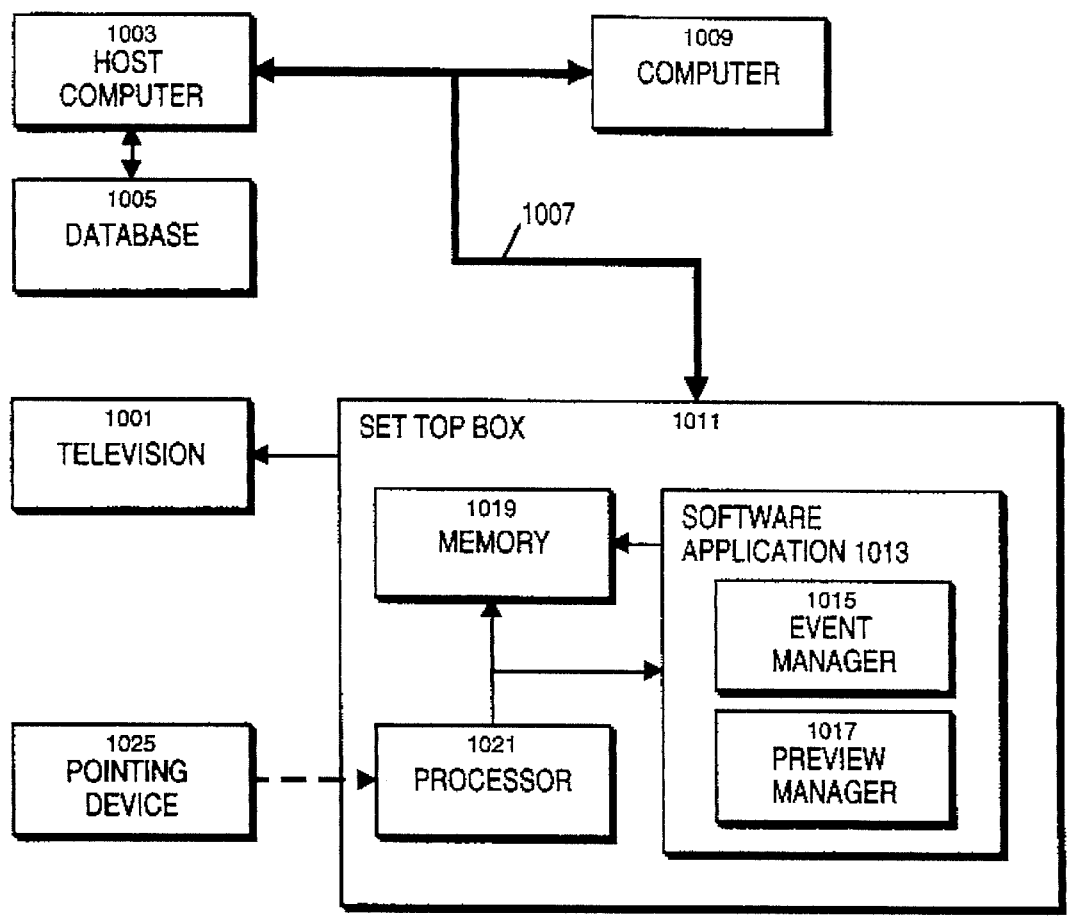
FIG. 10 is an illustration of one environment of the preferred embodiment.

The foregoing description has described the operation and structure of the matrix architecture user interface 101 independent of any specific apparatus or environment for implementing the interface. Referring now to FIG. 10, there is shown one of the preferred operating environments of the matrix architecture user interface 101. This environment includes a conventional television receiver 1001 and a set-top box 1011 coupled to a host computer system 1003 of a service provider, whereon the service provider maintains a large multimedia database 1005 of information, products and services in a mass storage unit operative coupled to the host computer system 1003. In the preferred embodiment, the host computer system 1003 is a UNIX based media server, such as a Silicon Graphics™ Challenge L™ server, and the set-top box 1009 is supplied by vendors such as Scientific Atlanta™ or Silicon Graphics™. The host computer system 1003 is coupled via a standard telecommunications link 1007 to the viewer's set-top box 1011, which in turn feeds a signal to the television receiver 1001 for display. This telecommunications link 1007 can be either cable, telephone line, broadcast, or satellite based, or any other communications technology of sufficient bandwidth and transmission quality. Alternatively, a computer 1009 can be used for connection via the telecommunications link 1007 to the host computer system 1003, for interaction with the host computer computer system 1003 via the matrix architecture user interface 101.

The matrix architecture user interface 101 is provided by a software application 1013 operating either in the set-top box 1011, or the computer 1009. The software application 1013 can be either permanently resident in the set-top box 1011 in an appropriate memory circuit 1019, or similarly in the computer 1009, or can be downloaded from the host computer system 1003 to one of these devices when activated by the viewer. Alternatively, the software application 1013 can be provided on a portable storage medium and loaded into the computer 1009 or set-top box 1011 as needed. The set top box 1011 includes a processor 1021 for controlling execution the software application 1013, and for accessing the host computer system 1003 in accordance with programmed instructions of the software application 1013. In the preferred embodiment, the software application 1013 interacts with the host computer system 1003 in a client-server relationship, retrieving data from the database 1005 to create the various matrices 103 and 104, and cells 105 of the matrix architecture user interface 101. The processor 1021 and computer 1009, may each include conventional microprocessors, such as the Motorola™ 68040, the Intel™ i486™, the MIPS™ R4000 family, or the like, as suitable to the specific implementation requirements of the device.

The viewer interacts with the matrix architecture user interface 101 with a pointing device 1025, such as a remote control unit for a television, or a mouse for a computer, a touch pad or touch screen, a joystick, or a voice processor for recognizing vocal commands. or any like device providing a sufficient variety of controls for invoking the various functions and operations of the matrix architecture user interface 101. In the preferred embodiment, the pointing device is a conventional infra-red based remote control having controls that allow up/down and left/right movement, along with conventional controls for "select" or "play," operations. The set-top box 1011, or alternatively, the host computer system 1003 that is coupled to the set-top box 1011, receives signals from the pointing device 1025, processes these signals to control execution of the software application 1013 according to the above described functions, depending on the current mode of the matrix architecture user interface 101, and affects the resulting changes.

Figure 12:
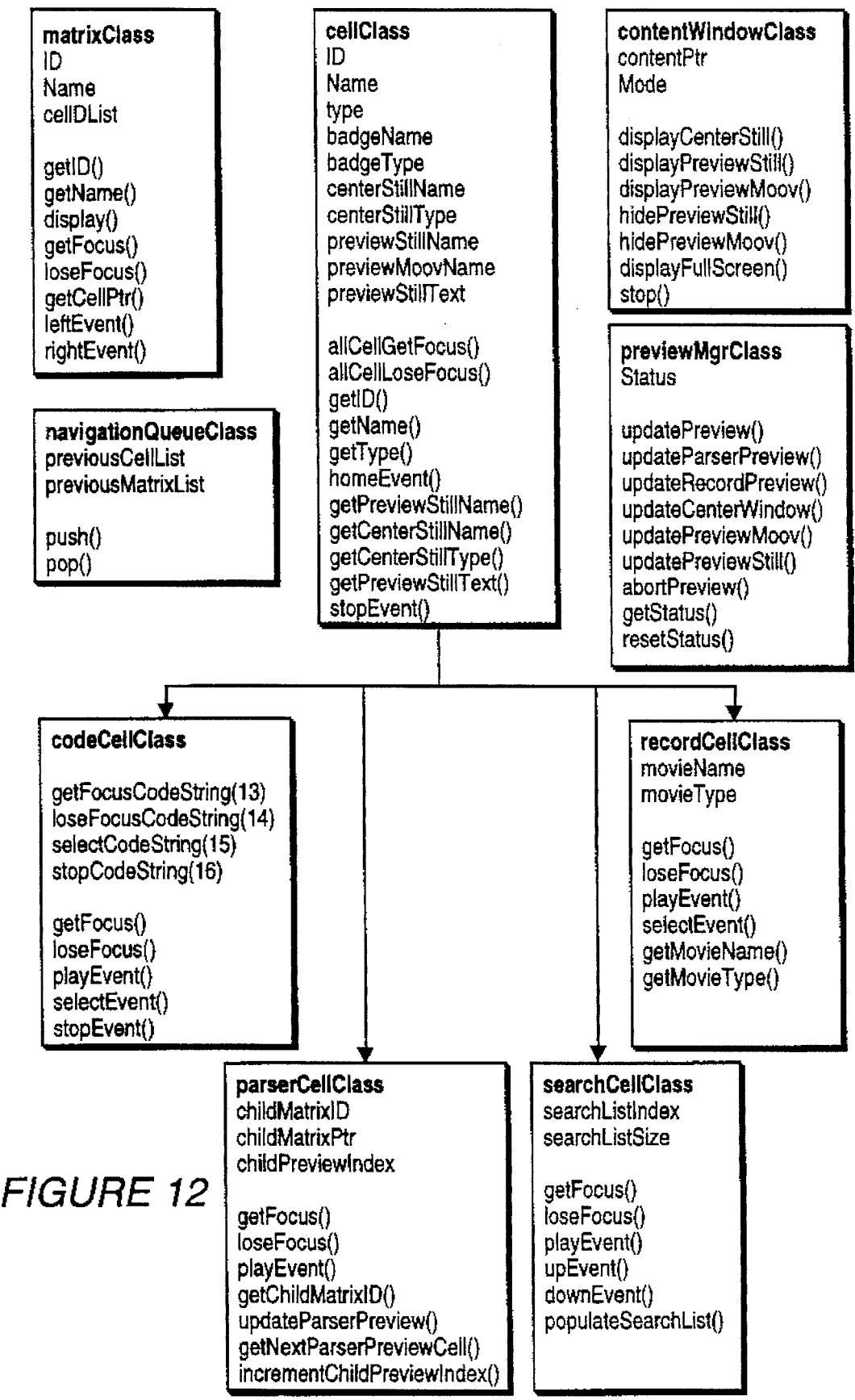
FIG. 12 is a diagram of the object classes used in a preferred embodiment of the present invention.

The software application 1013 that provides the matrix architecture user interface 101 is preferably implemented using object oriented programming techniques. The matrix architecture user interface 101 can be implemented with a traditional procedural programming methodology, and the functions and operations described above, along with the accompanying flowcharts, show the logical operations that are performed in either object oriented or procedural embodiments. However, it has been found that various elements of the matrix architecture user interface 101, including the cells, matrices, and the content window 107, are appropriate for implementation as objects. The above described functions are preferably implemented as methods in the appropriate objects as shown in FIG. 12. FIG. 12 shows an object oriented diagram of the methods and attributes for the various objects used in the preferred implementation of the matrix architecture user interface 101 in an object oriented environment.

In the preferred embodiment, there is a general cell class that includes the attributes and methods common to all the cell types. These attributes include a cell identifier, a name or title, indicators for the image, or icon 113, and may include information related to the type of preview for the cell. All cells include methods responsive to the focus command 400, the select command 500, and the play command 600. Each cell type, or class, performs the operational steps appropriate to the class where a given command effects each cell class differently. In addition, specific cell classes include their own specific methods. The parser cell class includes methods or attributes. The parser cell class includes attributes for identifying the matrix 104 associated with each parser cell, and for identifying the order of previews for each parser cell. Also, the parser cell class includes methods for retrieving previews of cells in the associated matrix 104. The search cell class includes methods for retrieving the titles, according to any filtering parameters, of the records cells in the matrices 104 at or below the matrix 104 of a given search cell, responsive to the select command 500.

The content window 107 also includes various methods for displaying previews or the data of a record, and changing the size of the content window 107 depending on the information being displayed. Each matrix 104 is stored as an object and contains a list of the cells included in the matrix 104. In addition, in the preferred embodiment there are separate lists maintained in the memory 1019 for storing each matrix 104 and each cell 105 in the database 1005. Matrices 104 include methods responsive to the focus command 400 for updating the displayed matrix 103 with the cells 105 of a given matrix.

The database 1005 of the service provider is comprised a plurality of records that can represent various types of data, including text, graphics, video, audio, animations, or any medium or combination thereof. In addition, the database may include links to databases of various product vendors, and thereby access to records of products and services offered by such vendors. The database may be organized in any manner that allows the matrix architecture user interface 101, upon activation, to identify the hierarchical structure of the database, and the records for use in the various cells types.

The software application 1013 includes an event manager 1015 for receiving and processing inputs from the pointing device 1025, and messages from the components of the matrix architecture user interface 101, and for sending messages to various elements of the matrix architecture user interface 101 for effecting its operations. The event manager 1015 determines the appropriate object for receiving messages based on the current mode of the matrix architecture user interface 101. The software application 1013 further includes a preview manager 1017 for managing the display of previews of focused cells, including record cells and parser cells. The preview manager 1017 responds to messages from the event manager 1015 requesting the display of various previews in the content window 107. Other modules, not illustrated here, are included in the software application 1013 for performing conventional memory, system maintenance, and related functions, as well known in the art. In alternate embodiments, such as a traditional procedural implementation, the software application 1013 would include routines that effect the various commands, such as the focus, select, play, and various movement commands, implementing the logic of the flowcharts disclosed herein.

Figure 11:
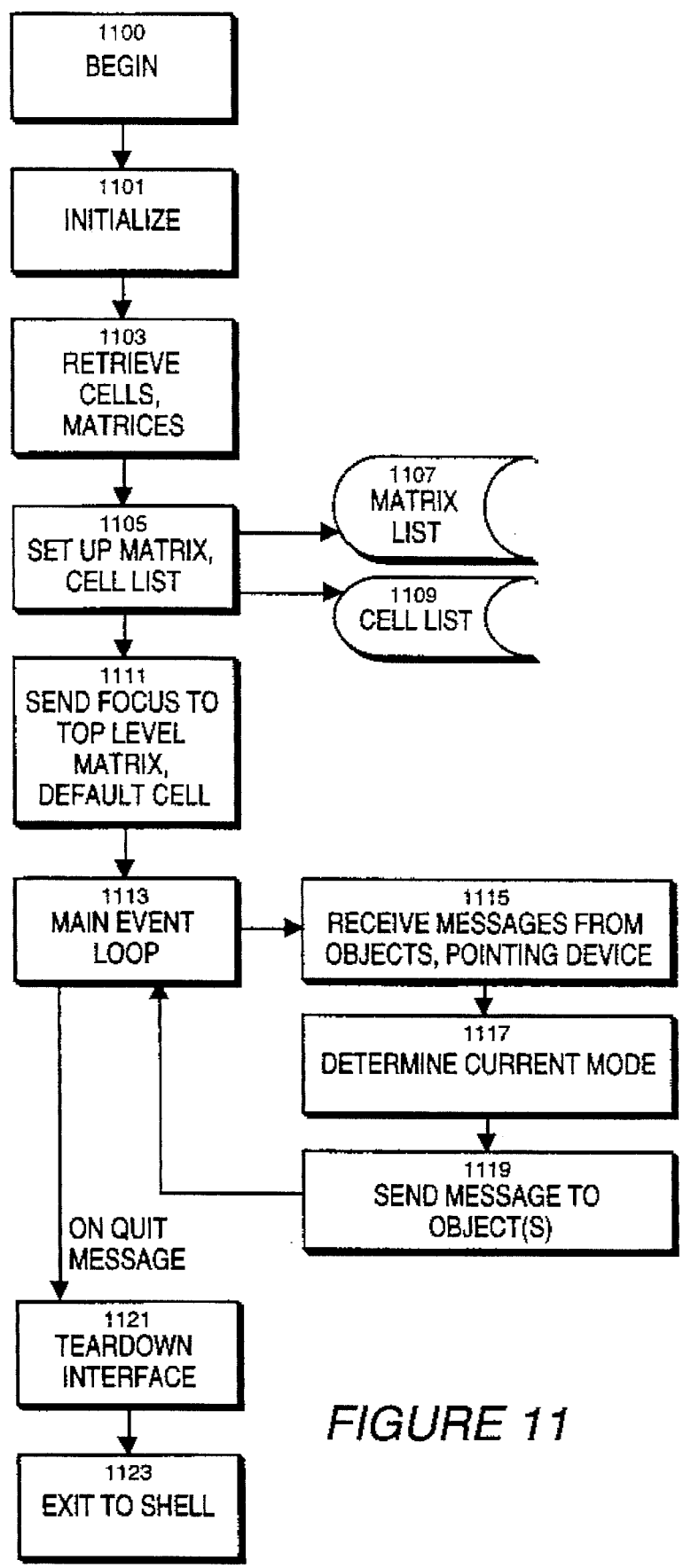
FIG. 11 is a flowchart of the operation of a software application for implementing the matrix architecture user interface of the present invention.

FIG. 11 shows a flowchart of the operational flow of the software application 1013 for producing the matrix architecture user interface 101. The software application 1013 begins by initializing 1101 various routines and memory locations in the memory 1019 for preserving information about the matrices 104, cells 105 and other elements of the matrix architecture user interface 101. The cells 105 and matrices 104 are then populated 1103 by retrieving from the underlying database 1005 of the service provider information about the records in the database. Since, in the preferred embodiment, the cells 105 and matrices 104 are determined each time the software application 1013 is started by the viewer, the service provider is able to continually update its database 1005 to provide new records. These new records will then be identified and incorporated as record or parser cells in the appropriate matrix 104. A matrix list 1107 is created 1105 identifying each matrix 104 in the database, and a cell list 1109 identifies each cell in the database, the lists being stored in the memory 1019. Pointers to the current matrix and cell are maintained in the memory 1019.

Once the database structure underlying the matrix architecture user interface 101 is set up, the software application 1013 invokes 1111 a focus command 400 for the default cell of the top level matrix 104, thereby initiating the browse mode 301, and the display of previews for the cells of the top level matrix. The event manager 1015 begins a main event loop 1113, during which the event manager 1015 receives 1115 various inputs, determines 1117 the current mode of operation, and sends 1119 messages to the various cells and matrices to effect the viewer's desired action. The event manager continues its operation in the main event loop 1113 until the viewer quits the application. On a quit message, the software application 1013 tears down 1121 the matrix architecture user interface 101 and the established memory structures by deleting them from the memory 1019, and exits 1123 to the operating system shell supporting the application.

In summary, the matrix architecture user interface 101 provides a simple and powerful interface for accessing a large database of information. The matrix architecture user interface 101 flexibly supports passive and active browsing, or active searching, seamlessly adopting to the viewer's desired mode of interaction. The matrix architecture user interface 101 allow a viewer to access any record in the database in a rapid fashion, by allowing the user to bypass multiple levels of the database using the focus and select commands. This ability to rapidly view and access individual records encourages exploration of the database and retrieval of records. The access methods provided by the matrix architecture user interface 101 are powerful and intuitive and require minimal time for learning by the viewer, in contrast to conventional code based interfaces that require mastering a complex searching language.

We claim:

1. A system including a display screen and a first database of records, each record represented by a record cell having preview data, content data, identification data, and attributes, providing a user interface to the first database and comprising:

a) a first plurality of displayed cell positions, each cell position displaying either:
      a.1) identification data of a record cell; or,
      a.2) identification data of a parser cell;
   the cells displayed in the first plurality of cell positions selected from of a hierarchical plurality of matrices, each matrix including a plurality of cells, the plurality of cells including record cells or parser cells, each parser cell associated with a matrix in the plurality of matrices; each of the first plurality of cell positions responsive to:
      a.3) a first user input to focus the cell displayed in the cell position; and
      a.4) a second user input to select the cell in the cell position when the cell displayed therein is focused; and,
      a.5) a third user input to play the cell in the cell position when the cell displayed therein is focused;
   b) a content window that displays selected data of a cell;

c) a computer program stored in a computer readable memory and receiving user inputs, that:
- c.1) in response to a first user input to focus a cell in a cell position:
  - c.1.1) displays in the content window a preview of the focused cell, the preview of a focused record cell containing preview data of the focused record cell, and the preview of a focused parser cell including a sequence of previews for the plurality of cells in the matrix associated with the focused parser cell;
  - c.1.2) continues to display in the cell position of the focused cell the identification data thereof; and,
  - c.1.3) continues to display in the cell position of each non-focused cell the identification data of the non-focused cell.

2. The user interface of claim 1, wherein the computer program stored in the computer readable memory:
- c.2) in response to a second user input to select a focused record cell, the preview of which is displayed in the content window, the computer program either:
  - c.2.1) initiates in and continues to displays in the content window content data included in the record cell while continuing to display in each cell position of each non-selected cell the identification data of the non-focused cell; or,
  - c.2.2) removes all displayed cell positions, and initiates and continues to display at full screen size content data included in the record cell;
- c.3) in response to a third user input to play a focused parser cell, the preview of which is preview data of a record cell which is displayed in the content window at a time when the third user input is received, the computer program either:
  - c.3.1) initiates in and continues to displays in the content window content data included in the record cell which is displayed in the content window at the time when the third user inputs is received, while continuing to display in each cell position of each non-selected cell the identification data of the non-selected cell; or
  - c.3.2) removes all displayed cell positions, and initiates and continues to display at full screen size content data included in the record cell which is displayed in the content window at the time when the third user inputs is received.

3. The user interface of claim 2, wherein the computer program stored in the computer readable memory:
- c.4) in response to a second user input on a cell position of a focused parser cell to select the parser cell:
  - c.4.1) updates the plurality of cell positions to display the matrix associated with the selected parser cell; and,
  - c.4.2) focuses one of the cell positions, causing a preview of the focused cell to display in the content window.

4. The user interface of claim 3, wherein the computer program stored in the computer readable memory:
- c.5) in response to a fourth user input to move back to a previous display of cells of a first matrix during the display of cells of a second matrix associated with a parser cell in the first matrix:
  - c.5.1) displays in the plurality of cell positions the cells in the first matrix including the parser cell; and,
  - c.5.2) focuses the parser cell to display in the content window of a preview of the parser cell, the preview including a sequence of previews for the cells in the second matrix.

5. The user interface of claim 3, further comprising:
a default cell position in the first plurality of cell position that is automatically focused after a matrix of cells is displayed by the computer program in response to a second user input on a cell position of focused parser cell to select the parser cell.

6. The user interface of claim 2, wherein the computer program is further responsive to a fourth user input to stop the display of content data of a record cell and focus a cell position in the displayed matrix, such that the content window displays a preview of the focused cell.

7. The user interface of claim 1, wherein the computer program in the absence of a user input for a predetermined interval of time automatically focuses selected ones of the plurality of displayed cell positions in a predefined order to:
1) display in the content window a preview of a selected focused cell, the preview of a focused record cell containing second selected data of the focused record cell, and the preview of a focused parser cell including a sequence of previews for the plurality of cells in the matrix associated with the focused parser cell;
2) continue to display in the cell position of the selected focused cell the first selected data thereof; and,
3) continue to display in the cell position of each non-focused cell the first selected data of the non-focused cell.

8. The user interface of claim 1, wherein the computer program in response to a fourth user input updates the cell positions to display the cells of a first matrix, and focuses a selected parser cell in the first matrix to cause the display in the content window of a preview of the selected parser cell, the preview including a sequence of previews for the cells in the matrix associated with the selected parser cell.

9. The user interface of claim 1, wherein the computer program is responsive to a fourth user input to accelerate a preview displayed in the content window.

10. The user interface of claim 1, wherein the computer program is responsive to a fourth user input to display in a reverse manner a preview displayed in the content window.

11. The user interface of claim 1, wherein the computer program is responsive to a fourth user input to increment the display in the content window to a next preview of a cell in the sequence of previews for the plurality of cells in the matrix associated with the focused parser cell.

12. The user interface of claim 1, wherein the computer program is responsive to a fourth user input to decrement the display in the content window to a previous preview of a cell in the sequence of previews for plurality of cells in the matrix associated with the focused parser cell.

13. The user interface of claim 1, further comprising:
a user configured matrix of cells containing cells designated by a user;
a user configured parser cell associated with the user configured matrix; the user configured matrix displayed in the first plurality of cell positions by the computer program in response to a second user input to select the user configured parser cell.

14. The user interface of claim 1, further comprising:
at least one matrix in the hierarchical plurality of matrices includes a search cell, the search cell associated with a search matrix that is accessed by a second user input to select the search cell in the matrix, the search matrix including at least one code cell that retrieves record cells contained only in matrices at or below the matrix containing-the selected search cell.

15. The user interface of claim 14, wherein the record cells retrieved by each code cell are contained in a linearized subtree associated with the matrix that includes the focused search cell.

16. The user interface of claim 14, wherein the search matrix further comprises:

at least one categorical code cell, having a categorical attribute, for retrieving record cells in matrices associated with a selected parser cell, the retrieved record cells having a selected attribute matching the categorical attribute of with the categorical code cell, wherein the identification data of the retrieved record cells is displayed in the content window.

17. The system of claim 1, further comprising:

a second database physically distant to the first database and communicatively coupled thereto, and including a plurality of records;

at least one matrix in the hierarchical plurality of matrices includes a search cell, the search cell associated with a search matrix that is accessed by a second user input to select the search cell in the matrix, the search matrix including at least one code cell that retrieves records in the second database.

18. The system of claim 1, wherein the focused parser cell occurs in level (n) of the database, the matrix associated with the focused parser cell is in level (n+1), and the sequence of previews for each parser cell (j) in the matrix associated with the focused parser cell includes a preview of a ($k^{th}$) record cell in a matrix in a level (n+m) below the first matrix, where m is greater than one.

19. A method for retrieving data from a database, the database organized through a plurality of hierarchically arranged matrices, each matrix including any combination of record cells, or parser cells, each record cell containing data, each parser cell associated with a matrix, the method comprising:

displaying a first matrix of cell positions, each cell position displaying identification data of a cell;

receiving an input to focus a cell in a cell position;

responsive to receiving an input to focus, a cell position including identification data of a record cell, displaying a preview of the record cell, the preview of a focused record cell containing preview data of the focused record cell;

responsive to receiving an input to focus a cell position including identification data of a parser cell, displaying a preview of the parser cell, the preview of a focused parser cell including a sequence of previews for the plurality of cells in a second matrix associated with the focused parser cell;

continuing to display in the cell position of the focused cell the identification data thereof; and continuing to display in the cell position of each non-focused cell the identification data of the non-focused cell.

20. The method of claim 19, further comprising:

automatically and sequentially focusing each of the cell positions in the first matrix in a defined order.

21. The method of claim 20, wherein the predetermined order is based on an advertising model.

22. The method of claim 19, further comprising:

receiving an input to select a focused cell position;

responsive to receiving an input to select a focused record cell, displaying content data of the focused record cell;

responsive to receiving an input to select a focused parser cell, displaying in the first matrix of cell positions cells in a second matrix associated with the focused parser cell, automatically focusing a default cell position in the displayed first matrix, and displaying a preview of the focused default cell.

23. The method of claim 22, wherein at least one matrix includes a search cell, further comprising:

displaying in a cell position in a first matrix a search cell;

responsive to receiving an input to focus a cell position including a search cell, displaying a search matrix, the search matrix including cells for retrieving record cells at or below the matrix that includes the focused search cell.

24. The method of claim 19, wherein the focused parser cell occurs in level (n) of the database, the matrix associated with the focused parser cell is in level (n+1), and the sequence of previews for each parser cell (j) in the matrix associated with the first parser cell includes a preview of a ($k^{th}$) record cell in a second matrix in a level (n+m) below the first matrix, where m is greater than one.

25. The method of claim 19, further comprising:

receiving an input to select one of the previews displayed for the focused cell; and, retrieving content data of the record cell having the selected preview.

26. A system providing a user interface for accessing a database, comprising:

a) a display device for displaying data;

b) a content window on the display device that displays selected data of a cell;

c) a hierarchical plurality of matrices, each matrix including a plurality of cells, including record cells or parser cells, each parser cell associated with a matrix, at least one matrix being displayed to a user through a plurality of cell positions on the display device, each cell position associated with a cell in the matrix and displaying identification data of the cell, each cell in a matrix associated computer executable methods responsive to a pointing device, including:

c.1) a focus method that receives a first user input to focus the cell, and in response to thereto:

c.1.1) displays in the content window a preview of the focused cell, the preview of a focused record cell containing preview data of the focused record cell, and the preview of a focused parser cell including a sequence of previews for the plurality of cells in the matrix associated with the focused parser cell; and, c.1.2) continues to display in the cell position of the focused cell the identification data thereof, such that each cell position of a non-focused cell continues to display the identification data of the non-focused cell.

27. The system of claim 26, wherein each cell further comprises:

c.2) a select method that receives a second user input to select the cell, and in response thereto:

c.2.1) where the selected cell is a record cell, either:

c.2.1.1) initiates in and continues to display in the content window content data included in the record cell while continuing to display in each cell position of each non-selected cell the identification data of the non-focused cell; or, c.2.1.2) removes all displayed cell positions, and initiates and continues to display at full screen size of the display content data included in the record cell;

c.2.2) where the selected cell is a parser cell, displays in the plurality of cell positions on the display device cells of the matrix associated with the selected parser cell, and focuses one of the cell positions, displaying a preview of the focused cell in the content window.

28. The system of claim 26, wherein each cell further comprises:

c.3) a play method that receives a third user input to play a focused cell, and in response thereto:

c.3.1) where the cell is a parser cell, the preview of which includes preview data of a record cell displayed in the content window at a time when the third user input is received, either:

c.3.1.1) initiates in and continues to displays in the content window, content data included in the record cell which is displayed in the content window at the time when the third user input is received, such that each cell position of each non-selected cell continues to display the identification data of the non-selected cell; or, c.3.1.2) removes all displayed cell positions, and initiates and continues to display at full screen size of the display device content data included in the record cell.

c.3.2) where the cell is a record cell, either:

c.3.2.1) initiates in and continues to displays in the content window content data included in the record cell such that each cell position of each non-selected cell continues to display the identification data of the non-selected cell; or, c.3.2.2) removes all displayed cell positions, and initiates and continues to display at full screen size of the display device content data included in the record cell.

29. The system of claim 26, wherein:

each matrix is associated with a computer executable method that in the absence of a user input to a cell in the matrix for a predetermined interval of time when the matrix is displayed on the display device, automatically invokes the focus method of particular ones of the plurality of displayed cell positions in a predefined order, such that the preview of each particular ones of the cells is displayed in the content window.

30. The system of claim 26, wherein each cell includes a method that accelerates a preview of the cell displayed in the content window.

31. The system of claim 26, wherein each cell includes a method that displays in a reverse manner a preview of the cell displayed in the content window.

32. The system of claim 26, wherein each parser cell includes a method that displays in the content window a next preview of the cell in the sequence of previews for the plurality of cells in the matrix associated with the parser cell.

33. The system of claim 26, wherein each parser cell includes a method displays in the content window a previous preview of a cell in the sequence of previews for plurality of cells in the matrix associated with the focused parser cell.

34. The system of claim 26, wherein each matrix further comprises:

a default cell of which the focus method of the cell is automatically invoked after the matrix is displayed on the display device, such that the preview of the default cell is displayed in the content window.

35. The system of claim 26, further comprising:

a user configured matrix of cells containing cells designated by a user;

a user configured parser cell associated with the user configured matrix; the user configured matrix displayed on the display device in response to a second user input to select the user configured parser cell when a matrix containing the user configured parser cell is displayed on the display device.

36. The system of claim 26, wherein:

at least one matrix in the hierarchical plurality of matrices includes a search cell, the search cell associated with a search matrix that is accessed by a second user input to select the search cell in the matrix, the search matrix including at least one code cell, each code cell including a computer executable method that retrieves record cells contained only in matrices at or below the matrix containing the selected search cell.

37. The system of claim 34, wherein computer executable method of a code cell retrieves record cells in a linearized subtree associated with the matrix that includes the focused search cell.

38. The system of claim 34, wherein the search matrix further comprises:

at least one categorical code cell, having a categorical attribute, the categorical code cell including a computer executable method that retrieves record cells in matrices associated with a selected parser cell, the retrieved record cells having a selected attribute matching the categorical attribute of with the categorical code cell, wherein identification data of the retrieved record cells is displayed in the content window.

39. The system of claim 26, wherein the focused parser cell occurs in level (n) of the database, the matrix associated with the focused parser cell is in level (n+1), and the sequence of previews for each parser cell (j) in the matrix associated with the focused parser cell includes a preview of a ($k^{th}$) record cell in a matrix in a level (n+m) below the first matrix, where m is greater than one.

40. A system providing a user interface to a database, comprising:

a) a processor;

b) a database including a hierarchical plurality of matrices, each matrix including a plurality of cells, the plurality of cells including leaf cells or parser cells, each parser cell associated with a subordinate matrix of cells, including leaf cells and parser cells, in the plurality of matrices;

c) a display device;

d) a computer program stored in a computer readable memory, and executable by the processor, that:

i) displays on the display device cells in a first matrix; and, ii) in response to a first user input to focus a displayed parser cell of the first matrix, displays on the display device concurrently with the focused parser cell and at least one non-focused cell in the first matrix, a first sequence of previews of cells in at least one second matrix subordinate to focused parser cell the first matrix.

41. The system of claim 40, wherein the computer program:

iii) in response to a second user input to select a focused parser cell, removes the displayed cells of the first matrix, and displays the cells in the subordinate matrix associated with the focused parser cell, and focuses one of the displayed cells of the subordinate matrix to display a preview of the focused cell concurrently with the cells of the subordinate matrix.

42. The system of claim 40, wherein the computer program:

iv) in the absence of a user input for a predetermined interval of time automatically focuses selected ones of the of displayed cells in a predefined order, and for each of the focused cells, displays a preview of the focused cell.

43. The system of claim 40, wherein the computer program:

v) in response to a third user input to play a leaf cell, the preview of which is being displayed in response to a first user input to focus a parser cell in the first matrix, removes all displayed cells, and initiates and continues to content data included in the leaf cell.

* * * * *